US010931870B2

(12) United States Patent
Qin et al.

(10) Patent No.: US 10,931,870 B2
(45) Date of Patent: Feb. 23, 2021

(54) SYSTEMS AND METHODS FOR VIDEO PROCESSING

(71) Applicant: ZHEJIANG DAHUA TECHNOLOGY CO., LTD., Zhejiang (CN)

(72) Inventors: Changhong Qin, Hangzhou (CN); Shouyi Wang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 53 days.

(21) Appl. No.: 16/262,844

(22) Filed: Jan. 30, 2019

(65) Prior Publication Data

US 2019/0166303 A1    May 30, 2019

Related U.S. Application Data

(63) Continuation of application No. PCT/CN2017/096016, filed on Aug. 4, 2017.

(30) Foreign Application Priority Data

Aug. 5, 2016 (CN) .......................... 201610637589.5

(51) Int. Cl.
*H04N 5/232* (2006.01)
*H04N 7/18* (2006.01)
(Continued)

(52) U.S. Cl.
CPC ... *H04N 5/23229* (2013.01); *G08B 13/19689* (2013.01); *H04N 5/23203* (2013.01);
(Continued)

(58) Field of Classification Search
CPC ............. G08B 13/19689; H04N 21/00; H04N 21/21805; H04N 5/23203; H04N 5/23206;
(Continued)

(56) References Cited

U.S. PATENT DOCUMENTS 10,148,875 B1 * 12/2018 Chen ................... H04N 21/2343
2003/0093784 A1 * 5/2003 Dimitrova ................ H04N 7/18
725/10
(Continued)

FOREIGN PATENT DOCUMENTS

CN    101330604 A    12/2008
CN    103731552 A    4/2014
(Continued)

OTHER PUBLICATIONS

International Search Report in PCT/CN2017/096016 dated Nov. 6, 2017, 4 pages.
(Continued)

*Primary Examiner* — Amy R Hsu
(74) *Attorney, Agent, or Firm* — Metis IP LLC

(57) ABSTRACT

The present disclosure relates to a system, method and non-transitory computer readable medium. The system includes: an input port configured to receive a first video from a camera; an output port configured to out a second video; one or more storage media including a set of instructions for modifying the first video; and one or more video processors in communication with the one or more storage media, each video processor including an internal cache memory. When executing the set of instructions, the one or more video processors: obtain the first video from the camera; obtain at least one operation parameter relating to the camera from the input port; generate a target image graphically illustrating an operation of the camera based on
(Continued)

the at least one operation parameter; reconstruct the second video based on the target image and the first video; and send the second video to the output port.

14 Claims, 17 Drawing Sheets

(51) Int. Cl.
    *H04N 21/218* (2011.01)
    *H04N 21/00* (2011.01)
    *G08B 13/196* (2006.01)

(52) U.S. Cl.
    CPC ........... *H04N 5/23216* (2013.01); *H04N 7/18* (2013.01); *H04N 21/00* (2013.01); *H04N 21/21805* (2013.01)

(58) Field of Classification Search
    CPC ... H04N 5/23216; H04N 5/23229; H04N 7/18
    See application file for complete search history.

(56) References Cited

U.S. PATENT DOCUMENTS

| | | | | |
|---|---|---|---|---|
| 2006/0001757 A1* | 1/2006 | Sawachi | ................ | H04N 5/232 348/333.12 |
| 2013/0040700 A1* | 2/2013 | Nishikawa | ......... | H04N 5/23245 455/556.1 |
| 2013/0321688 A1* | 12/2013 | Nishimura | ......... | G01C 21/3647 348/333.12 |
| 2014/0071349 A1 | 3/2014 | Ramo et al. | | |
| 2016/0127634 A1* | 5/2016 | Yamashita | ......... | H04N 5/23293 348/211.3 |

FOREIGN PATENT DOCUMENTS

| | | |
|---|---|---|
| CN | 105007415 A | 10/2015 |
| CN | 105136135 A | 12/2015 |
| KR | 101297294 B1 | 9/2013 |
| WO | 2018024249 A1 | 2/2018 |

OTHER PUBLICATIONS

First Office Action in Chinese application No. 201610637589.5 dated Sep. 11, 2018, 17 pages.
Written Opinion of the International Searching Authority in PCT/CN2017/096016 dated Nov. 6, 2017, 5 pages.
Zeng Luan et al., Investigation Image Acquistion and Fusion Technology, 74-75 (2015).
The Extended European Search Report in European Application No. 17836430.3 dated Jun. 12, 2019, 11 pages.

* cited by examiner

SYSTEMS AND METHODS FOR VIDEO PROCESSING

CROSS-REFERENCE TO RELATED APPLICATION

The present disclosure is a continuation of International Application No. PCT/CN2017/096016, filed on Aug. 4, 2017, which claims priority of Chinese Application No. CN 201610637589.5 filed on Aug. 5, 2016, the content of which is hereby incorporated by reference in its entirety.

TECHNICAL FIELD

The present disclosure generally relates to systems and methods for video processing, and in particular, to systems and methods for video processing associated with a view angle image.

BACKGROUND

Network cameras are a new generation of camera by combining traditional cameras and network techniques. A network camera is capable of transmitting a video and/or an image to a user terminal through the network, either directly or through a webserver. A user may acquire and watch the video and/or the image in the webserver through a user terminal. In addition, an authorized user may further adjust parameters of the camera via the network, thereby remotely control the camera.

Traditionally, a user may only watch what was recorded by the network camera. He/she may not be able to know the exact position and orientation of the camera. Thus, there is a need to display parameter information, such as an angular aperture of the camera, etc. in the video.

SUMMARY

According to an aspect of the present disclosure, a system may include an input port configured to receive a first video from a camera; an output port configured to out a second video; one or more storage media including a set of instructions for modifying the first video; one or more video processors including one or more internal cache memory and in communication with the one or more storage media. When executing the set of instructions, the one or more video processors: obtain the first video from the camera; obtain at least one operation parameter relating to the camera from the input port; generate a target image graphically illustrating an operation of the camera based on the at least one operation parameter; reconstruct the second video based on the target image and the first video; and send the second video to the output port.

In some embodiments, the at least one operation parameter may include an orientation of the camera; and the target image graphically may illustrate the orientation of the camera.

In some embodiments, the at least one operation parameter may include a view angle of the camera; and the target image graphically may illustrate the view angle of the camera.

In some embodiments, to generate the target image, the one or more video processors may: determine that the camera is in a predetermined operation status by comparing the at least one operation parameter at a first time point and the at least one operation parameter at a second time point; and generate the target image to graphically illustrate a change of the at least one operation parameter between the first time point and the second time point.

In some embodiments, the one or more video processors may further: upon determining that the camera is in the predetermined operation status, generate a notification to notify that the camera is in the predetermined operation status.

In some embodiments, to determine that the camera is in the predetermined operation status, the one or more video processors may further: determine that a change occurred between the at least one operation parameter at the first time point and the at least one operation parameter at the second time point; determine that the camera received no instruction associated with a change of the at least one operation parameter; and determine that the camera is in the predetermined operation status.

In some embodiments, to determine that the camera is in the predetermined operation status, the one or more video processors may further: determine an actual change between the at least one operation parameter at the first time point and the at least one operation parameter at the second time point; determine that the camera received an instruction associated with the change of the at least one operation parameter; determine that the camera did not respond to the instruction to substantially achieve the change of the at least one operation parameter; and determine that the camera is in the predetermined operation status.

According to an aspect of the present disclosure, a method implemented on a computing device having at least one processor, at least one computer-readable storage medium, and a communication platform connected to a network may include: obtaining the first video from the camera; obtaining at least one operation parameter relating to the camera from the input port; generating a target image graphically illustrating an operation of the camera based on the at least one operation parameter; reconstructing the second video based on the target image and the first video; and sending the second video to the output port.

According to an aspect of the present disclosure, a non-transitory computer readable medium may include instructions configured to cause a computing system to: obtain the first video from the camera; obtain at least one operation parameter relating to the camera from the input port; generate a target image graphically illustrating an operation of the camera based on the at least one operation parameter; reconstruct the second video based on the target image and the first video; and send the second video to the output port.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
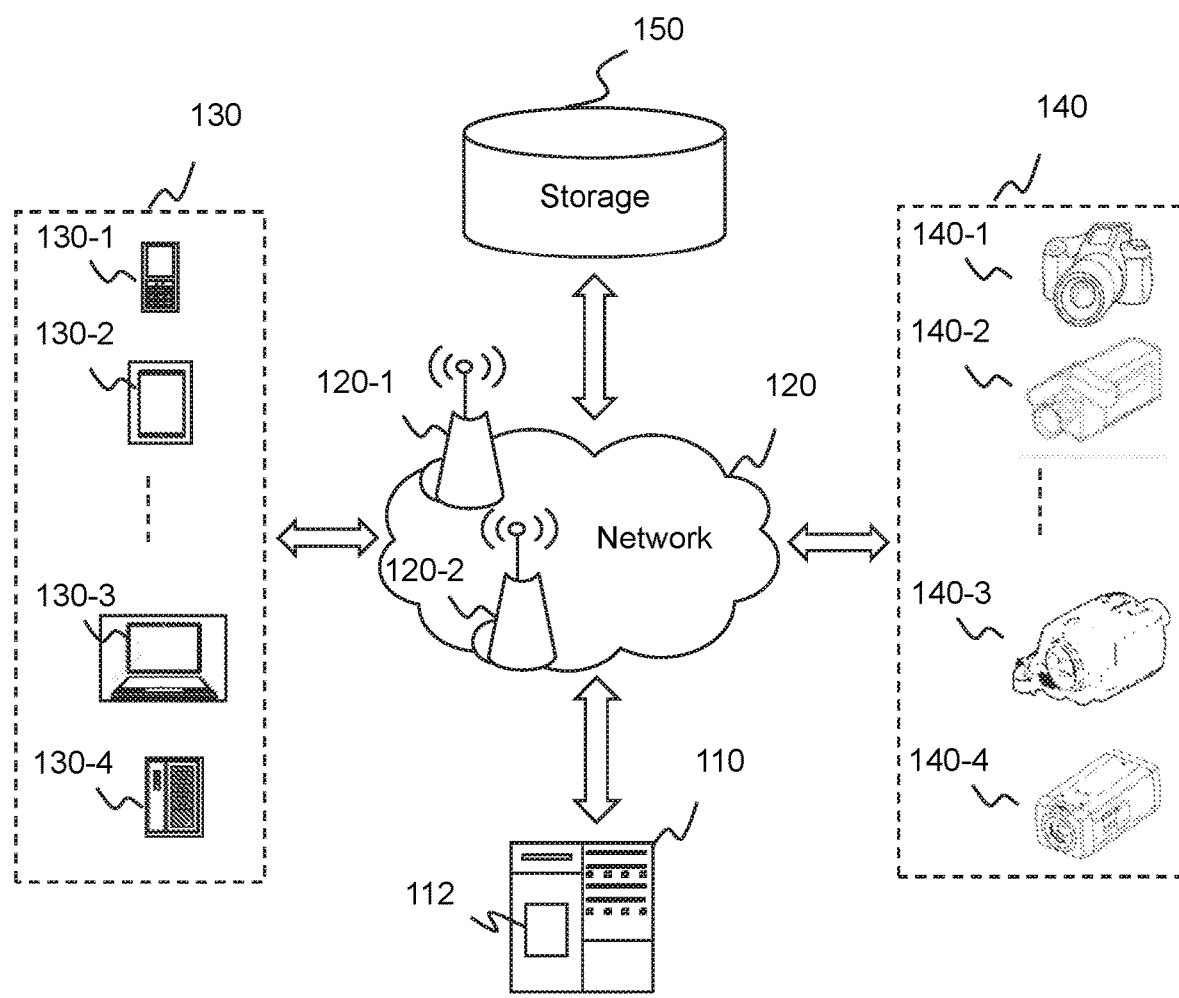
FIG. 1 is a schematic diagram illustrating an exemplary camera system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure provides systems and methods for video processing. The systems and methods may obtain one or more operation parameters (e.g., an angular aperture, an orientation) relating to a camera. The systems and methods may generate a target image (e.g., a view angle image) based on the one or more operation parameters. The systems and methods may generate a reconstructed video based on the target image and a video generated by the camera.

For the purposes of illustration, in the present discourse, a first time point may refer to a time point before a second time point. For example, information of one or more operation parameters at the first time point may refer to information of one or more operation parameters before an object event (e.g., a parameter change). Information of one or more operation parameters at the second time point may refer to information of one or more operation parameters after the object event. In some embodiments, the interval between the first time point and the second time point may refer to an interval between a first frame and a second frame of a video (e.g., two adjacent frames of a video). The interval may be ½ second, ⅕ second, 1/10 second, 1/20 second, one second, or any suitable interval.

FIG. 1 is a schematic diagram of an exemplary camera system 100 according to some embodiments of the present disclosure. The camera system 100 may be an online platform including at least one server 110, at least one network 120, at least one user terminal 130, at least one camera 140, and at least one storage 150. The server 110 may include a processor 112.

In some embodiments, the server 110 may be a single server, or a server group including a plurality of servers. The server group may be centralized, or distributed (e.g., server 110 may be a distributed system). In some embodiments, the server 110 may be local or remote. For example, the server 110 may access information and/or data (e.g., a user instruction, a video, angular aperture information, orientation information) stored in the user terminal 130, the camera 140, and/or the storage 150 via the network 120. As another example, the server 110 may connect the user terminal 130, the camera 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processor 112, such as a chip of image signal processor (ISP) and/or a chip of graphic processing unit (GPU) etc. The processor 112 may perform video processing by conducting one or more functions described in the present disclosure. For example, the processor 112 may generate a view angle image according to orientation information and angular aperture information. The processor 112 may generate a reconstructed video according to the view angle image. In some embodiments, the processor 112 may include one or more processing engines (e.g., single-core processing engine(s) or multi-core processor(s)). Merely by way of example, the processor 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or any image signal processing chips commercially available at the time of filing of this application, or any combination thereof. In some embodiments, the processor may include a memory. The memory may be an external memory or an internal row cache memory.

The network 120 may facilitate exchange of information and/or data. In some embodiments, one or more components of the camera system 100 (e.g., the server 110, the user terminal 130, the camera 140, and the storage 150) may transmit information and/or data to other component(s) in the camera system 100 via the network 120. For example, the server 110 may obtain a user instruction from the user terminal 130 via the network 120. As another example, the server 110 may obtain a video from the camera 140 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the camera system 100 may be connected to the network 120 to exchange data and/or information between them.

The user terminal 130 may control the camera 140 and obtain videos from the camera 140 via the network 120. For example, through the network 120, a user may operate the user terminal 130 send out a user instruction to the camera 140 to adjust one or more operation parameters (e.g., an angular aperture, an orientation) of the camera 140. As another example, the user terminal 130 may receive and display videos generated by the camera 140 via the network 120. In some embodiments, the user terminal 130 may include a desktop computer, a monitoring equipment (such as a security system used in a shopping mall), a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, built-in device in the motor vehicle 130-4 may include an onboard computer, an onboard television, etc. In some embodiments, the user terminal 130 may be a device with positioning technology for locating the position of the requestor and/or the user terminal 130.

The camera 140 may be and/or include any suitable device that is capable of acquiring image data, such as a camera 140-1, a video recorder 140-2, a scanner 140-3, a mobile telephone 140-4, a tablet computing device, a wearable computing device, an infrared video-taping device (e.g., a thermal video-taping device), and/or any other suitable device that may acquire image data. In some embodiments, the camera 140 may include a monocular camera, a binocular camera, etc. In some embodiments, the camera 140 may be a visible light camera or a thermal video-taping camera. The camera 140 may include a charge-coupled device (CCD), a complementary metal-oxide-semiconductor (CMOS) sensor, an N-type metal-oxide-semiconductor (NMOS), a contact image sensor (CIS), and/or any suitable image sensor.

The storage 150 may store data and/or instructions. In some embodiments, the storage 150 may store data obtained from the user terminal 130 and/or the camera 140. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the camera system 100 (e.g., the server 110, the user terminal 130, the camera 140). One or more components in the camera system 100 may access the data or instructions stored in the storage 150 via the network 120. In some embodiments, the storage 150 may be directly connected to or communicate with one or more components in the camera system 100 (e.g., the server 110, the user terminal 130, the camera 140). In some embodiments, the storage 150 may be part of the server 110. In some embodiments, information exchanging of one or more components of the camera system 100 may be achieved via an operation of the user terminal 130.

It should be noted that the application scenario illustrated in FIG. 1 is only provided for illustration purposes, and not intended to limit the scope of the present disclosure. For example, the user terminal 130 and/or the camera 140 may include the processor 112. The user terminal 130 and/or the camera 140 may reconstruct a video according to one or more operation parameters of the camera 140.

Figure 2:
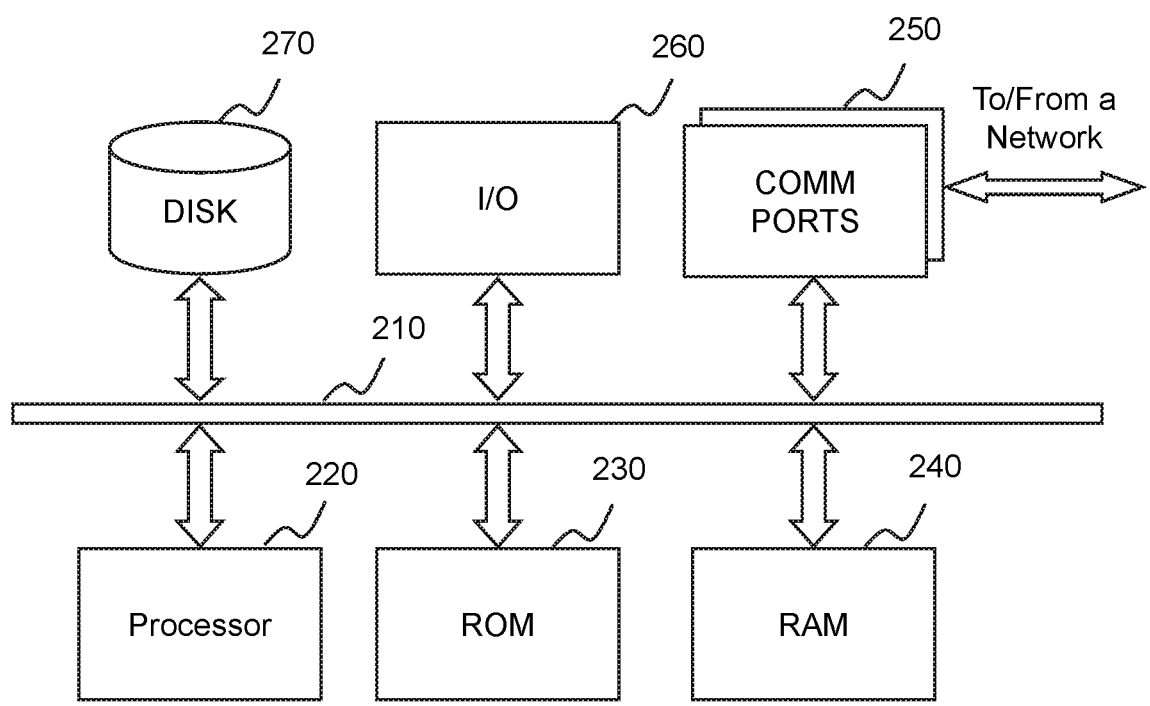
FIG. 2 is a schematic diagram illustrating an exemplary computing device in the camera system according to some embodiments of the present disclosure.

FIG. 2 is a schematic diagram illustrating exemplary hardware and software components of a computing device 200 on which the server 110, the user terminal 130, and/or the camera 140 may be implemented according to some embodiments of the present disclosure. For example, the processor 112 may be implemented on the computing device 200 and configured to perform functions of the processor 112 disclosed in this disclosure. As another example, the camera 140 may be implemented on the computing device 200 and configured to perform functions of the processor 112 disclosed in this disclosure.

The computing device 200 may be used to implement any component of the method as described herein. For example, the processor 112 may be implemented on the computing device 200, via its hardware, software program, firmware, or a combination thereof. Although only one such computer is shown, for convenience, the computer functions relating to the method as described herein may be implemented in a distributed fashion on a number of similar platforms, to distribute the processing load.

The computing device 200, for example, may include COM ports 250 connected to and from a network connected thereto to facilitate data communications. The exemplary computing device may include an internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by one or more processors, such as processor 220. According to some embodiments, the processor may include interface circuits and processing circuits therein. The interface circuits may be configured to receive electronic signals from the bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
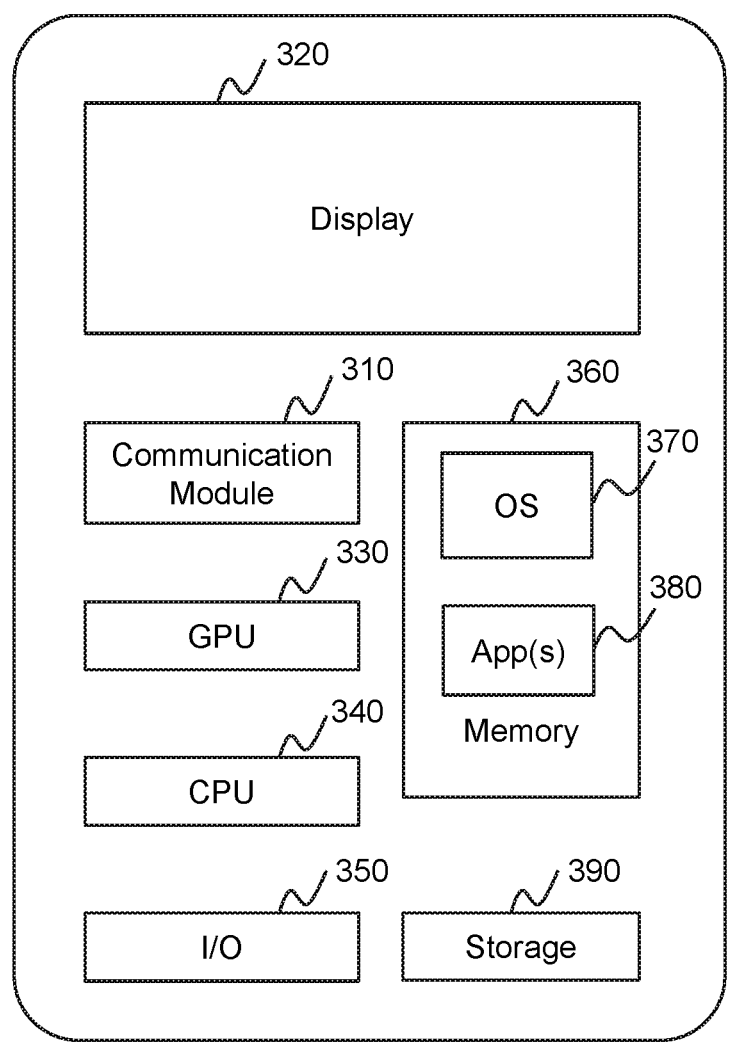
FIG. 3 is a schematic diagram illustrating an exemplary mobile device in the camera system according to some embodiments of the present disclosure.

FIG. 3 illustrates an exemplary mobile device on which the method in this application may be implemented, according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390.

In some embodiments, any other suitable component, including but not limited to a system bus or a controller (not shown), may also be included in the mobile device 300. In some embodiments, a mobile operating system 370 (e.g., iOS™, Android™' Windows Phone™, etc.) and one or more applications 380 may be loaded into the memory 360 from the storage 390 in order to be executed by the CPU 340. The applications 380 may include a browser or any other suitable mobile apps for receiving and rendering information associated with a service request (e.g., a start location, a destination) from the processor 112 and/or the storage 150. User interactions with the information stream may be achieved via the I/O 350 and provided to the processor 112 and/or other components of the camera system 100 via the network 120.

One of ordinary skill in the art would understand that when an element of the camera system 100 performs, the element may perform through electrical signals and/or electromagnetic signals. For example, when a user terminal 130 processes a task, such as making a determination, identifying or selecting an object, the user terminal 130 may operate logic circuits in its processor to process such task. When the user terminal 130 sends out a service request to the server 110, a processor of the service user terminal 130 may generate electrical signals encoding the request. The processor of the user terminal 130 may then send the electrical signals to an output port. If the user terminal 130 communicates with the server 110 via a wired network, the output port may be physically connected to a cable, which further transmit the electrical signals to an input port of the server 110. If the user terminal 130 communicates with the server 110 via a wireless network, the output port of the user terminal 130 may be one or more antennas, which convert the electrical signals to electromagnetic signals. Similarly, a camera 140 may process a task through operation of logic circuits in its processor, and receive an instruction and/or service request from the server 110 via electrical signals or electromagnet signals. Within an electronic device, such as the user terminal 130, the camera 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
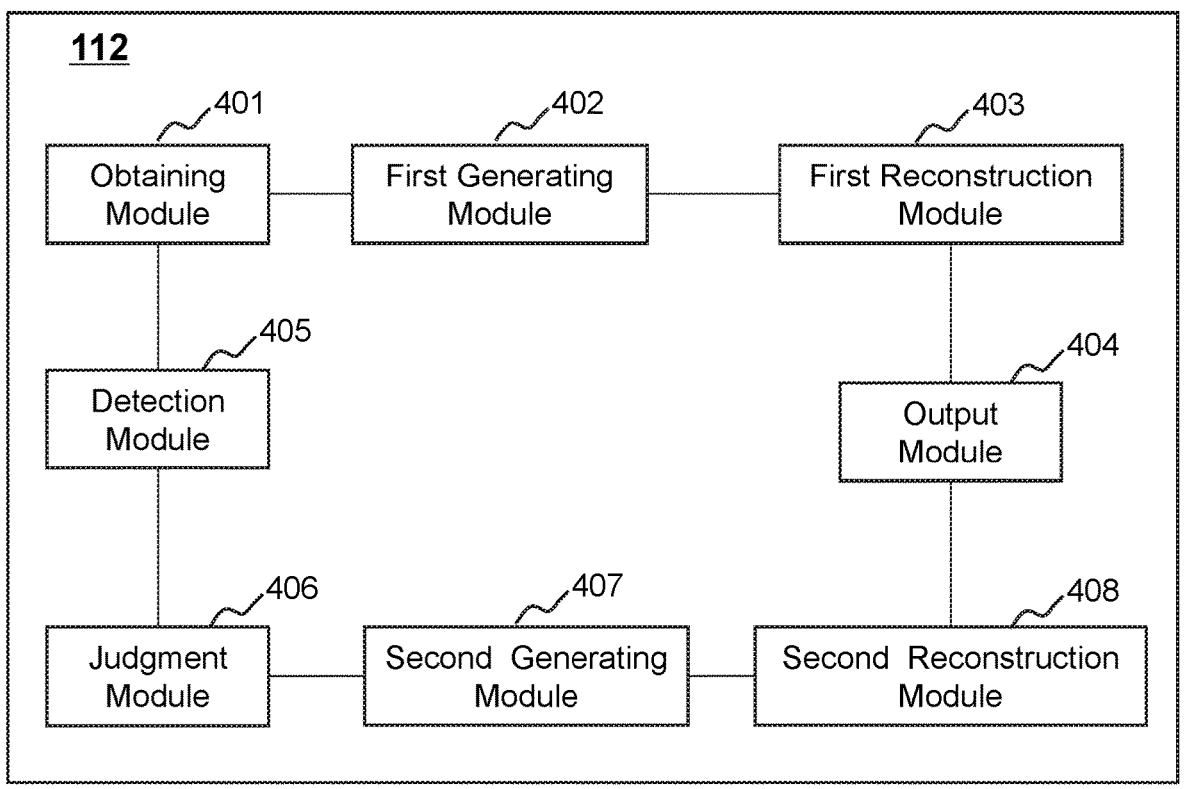
FIG. 4 is a block diagram illustrating an exemplary processor according to some embodiments of the present disclosure.

FIG. 4 is a block diagram illustrating an exemplary processor 112 according to some embodiments of the present disclosure. The processor 112 may include an obtaining module 401, a first generating module 402, a first reconstruction module 403, an output module 404, a detection module 405, a judgment module 406, a second generating module 407, and a second reconstruction module 408.

The obtaining module 401 may be configured to obtain information of one or more operation parameters of the camera 140. In some embodiments, the obtaining module 401 may obtain the information of the one or more operation parameters at different time points of a video-taping operation. For example, the obtaining module 401 may obtain the one or more operation parameters at a first time point and a second time point of the video-taping operation. The one or more operation parameters may relate to an area (i.e., monitored area) that the camera 140 may monitor, for example, the position of the monitored area (e.g., in the west), the size of the monitored area. In some embodiments, the one or more operation parameters may include an orientation and an angular aperture of the camera, etc. The orientation may represent a video-taping direction of the camera 140. Video-taping direction may be a direction along which the camera records the video. The orientation may be represented by an angle from a reference direction, such as 30° from north direction etc. Details regarding to the orientation and the angular aperture may be found in connection with FIG. 9.

Figure 8:
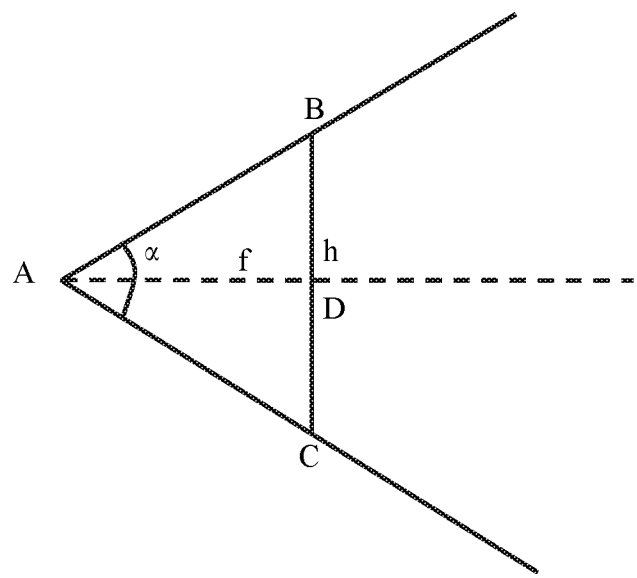
FIG. 8 is a schematic diagram illustrating an example for determining an angular aperture of a camera according to some embodiments of the present disclosure.

In some embodiments, the obtaining module 401 may determine one or more operation parameters based on information of the one or more parameters. For example, the obtaining module 401 may determine the angular aperture based on angular aperture information (e.g., an aperture of the lens of the camera 140 and the focal length of the lens). Referring to FIG. 8, for a lens of the camera 140, plane B-C may refer a center plane of the lens, where the center of the lens D resides. Point A may represent an imaging point (e.g., a focal point and/or a center point of the focal plane) where the light for an image is collected. α may represent an angular aperture of the camera 140, i.e., the angle α may be the maximal angle of the cone of light that passes the imaging point A and can enter or exit the lens. h may represent a diameter of the aperture of the lens. Focal length f may refer to a distance from the center of the lens D to the imaging point A. For example, when a lens is described as a "50 mm lens," it is referring that the lens' focal length f is 50 mm. Thus for the triangle ABD, equation (1) may be obtained according to a tangent trigonometric function.

$$\tan\left(\frac{\alpha}{2}\right) = \frac{h/2}{f}, \tag{1}$$

Through the derivation, equation (2) may be obtained according to the equation (1). The obtaining module 401 may determine the angular aperture based on the equation (2) as described below:

$$\alpha = 2\tan^{-1}\left(\frac{h}{2f}\right), \tag{2}$$

The first generating module 402 may be configured to generate a first view angle image. The first generating module 402 may generate the first view angle image based on information of one or more operation parameters.

Figure 9:
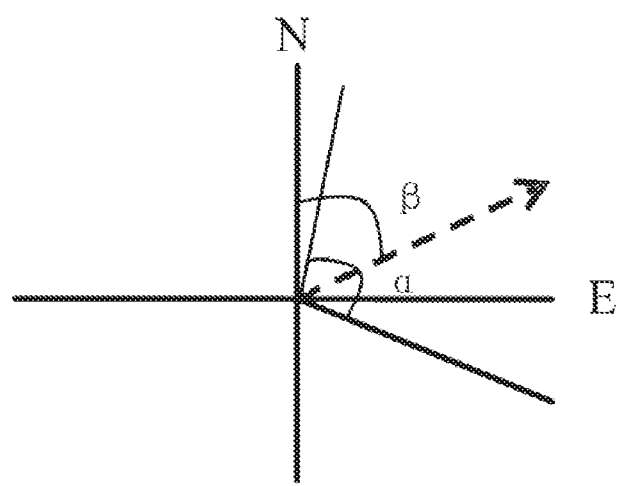
FIG. 9 is a schematic diagram illustrating an exemplary view angle image according to some embodiments of the present disclosure.

FIG. 9 is a schematic diagram illustrating an exemplary first view angle image described above, which integrates both the orientation information and the angular aperture information of the camera 140. As illustrated in FIG. 9, the first view angle image may include a geographical location coordinates (i.e., a reference coordinate) including a north direction (represented by N), an east direction (represented by E), a south direction, and a west direction. α may refer to an angular aperture of the camera 140. β may refer to an orientation of the camera 140, which may be the angle between the north direction and the video-taping direction. The dotted arrow may refer to the video-taping direction, which is along the bisector of α.

The orientation and the angular aperture of the camera 140 may be independent from each other. For example, as the video-taping direction of the camera 140 changes (i.e., the orientation β changes), the direction of the bisector of the angular aperture α may change accordingly, although the value of the angular aperture α may keep constant. As the lens focal length f of the camera 140 changes, the value of the angular aperture α may change accordingly, while the direction of bisector of the angular aperture α may keep constant. The value of the angular aperture α may become greater when the lens focal length f becoming shorter. On the other hand, the value of the angular aperture α may become smaller when the lens focal length f becoming greater.

The first reconstruction module 403 may be configured to reconstruct a first video based on the first view angle image generated by the first generating module 402. For example, the first reconstruction module 403 may combine the first view angle image and a video. The video may be generated at a same time point with the orientation information and the angular aperture information corresponding to the first view angle image.

The output module 404 may be configured to output information. The information may include information of one or more operation parameters, a view angle image, a video, a reconstructed video. For example, the output module 404 may transmit a reconstructed video to the user terminal 130, the storage 150, and/or any other device associated with the camera system 100. The reconstructed video may be generated by the first reconstruction module 403 or the second reconstruction module 408. In some embodiments, the output module 404 may transmit information to any device via a suitable communication protocol (e.g., the Hypertext Transfer Protocol (HTTP), Address Resolution Protocol (ARP), Dynamic Host Configuration Protocol (DHCP), File Transfer Protocol (FTP), etc.).

The detection module 405 may be configured to detect one or more changes of information of the one or more operation parameters. For example, the detection module 405 may be configured to detect the one or more changes of the one or more operation parameters. The detection module 405 may determine a difference between an operation parameter at a first time point and the operation parameter at a second time point. Further, the detection module 405 may detect and/or determine the change of the operation parameter based on the difference. Upon determining that the difference is greater than a threshold, the detection module 405 may determine that the change of the operation parameter occurs and detect the change. Optionally, upon determining that the difference is not greater than the threshold, the detection module 405 may determine that a change of information of the operation parameter does not occur and may not detect the change. When detecting a change of the angular aperture, for example, the threshold may be 0 degree, 1 degree, 2 degrees, or any suitable degrees. When detecting a change of the orientation, the threshold may be the same as or different from the threshold mentioned above.

The judgment module 406 may be configured to judge whether a change of information of one or more operation parameters is normal or abnormal, and to generate a judgment result. For example, the judgment module 406 may be configured to judge whether a change of an operation parameter is normal or abnormal. The normal change may refer to that the change satisfies one or more conditions. The abnormal change may refer to that the change does not satisfy the one or more conditions. The one or more conditions may be set manually or automatically by, for example, the camera 140, the processor 112. Details regarding to the one or more conditions may be described in connection with FIGS. 12, 15, 21 and the description thereof.

The second generating module 407 may be configured to generate a second view angle image. The second generating module 407 may generate the second view angle image based on a judgment result generated by the judgment module 406. When the judgment result is normal, meaning that the second generating module 407 determines that at least one operation parameter of the camera is normal, the second generating module 407 may generate the second view angle image based on one or more operation parameters at the second time point. For example, when a change of orientation information is normal, the second generating module 407 may generate the second view angle image based on the orientation information at the second time point (i.e., after changing). As another example, when a change of angular aperture information is normal, the second generating module 407 may generate the second view angle image based on the angular aperture information at the second time point (i.e., after changing). Additionally, when the judgment result is abnormal, the second generating module 407 may generate the second view angle image based on one or more operation parameters at the first time point and one or more operation parameters at the second time point. For example, when a change of orientation information is abnormal, the second generating module 407 may generate the second view angle image based on the orientation information at the first time point (i.e., before changing) and the orientation information at the second time point (i.e., after changing). As another example, when a change of angular aperture information is abnormal, the second generating module 407 may generate the second view angle image based on the angular aperture information at the first time point (i.e., before changing) and the angular aperture information at the second time point (i.e., after changing).

The second reconstruction module 408 may be configured to reconstruct a second video based on the second view angle image generated by the second generating module 407. For example, the second reconstruction module 408 may combine the second view angle image and a video. The video may be generated at a same time point with the second orientation information and the second angular aperture information corresponding to the second view angle image.

The modules in the processor 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the first generating module 402 and the second generating module 407 may be combined as a single module which may both generate the first view angle image and the second view angle image. As another example, the first reconstruction module 403 and the second reconstruction module 408 may be combined as a single module which may both generate the first video and the second video. As a further example, the modules in the processor 112 may include a storage unit (not shown) respectively.

Figure 5:
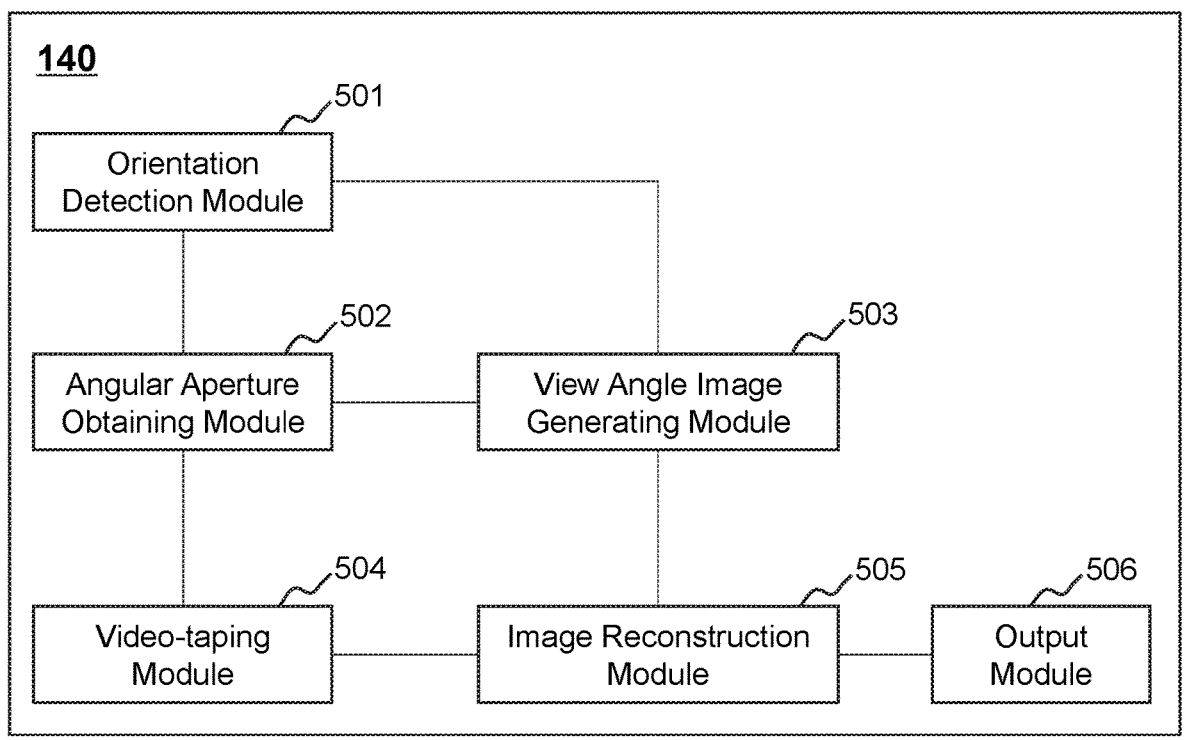
FIG. 5 is a block diagram illustrating an exemplary camera according to some embodiments of the present disclosure.

FIG. 5 is a block diagram illustrating an exemplary camera 140 according to some embodiments of the present disclosure. As illustrated, the camera 140 may include an orientation detection module 501, an angular aperture obtaining module 502, a view angle image generating module 503, a video-taping module 504, an image reconstruction module 505, and an output module 506.

The orientation detection module 501 may be configured to acquire orientation information of the camera 140. In some embodiments, the orientation detection module 501 may be the same as or different from the obtaining module 401. In some embodiments, the orientation detection module 501 may acquire the orientation information at different time points. For example, the orientation detection module 501 may acquire the orientation information at the first time point and the second time point.

In some embodiments, the orientation detection module 501 may acquire a rotating speed of the camera 140. The orientation detection module 501 may include a rotating speed sensor.

The angular aperture obtaining module 502 may be configured to acquire angular aperture information of the camera 140. In some embodiments, the angular aperture obtaining module 502 may be the same as, part of or different from the obtaining module 401. In some embodiments, the angular aperture obtaining module 502 may acquire the angular aperture information at different time points. For example, the angular aperture obtaining module 502 may acquire the angular aperture information at the first time point and the second time point.

In some embodiments, the angular aperture obtaining module 502 may determine an angular aperture of the camera 140 based on angular aperture information such as a diameter of a lens aperture, a lens focal length of the camera 140. In some embodiments, the angular aperture obtaining module 502 may determine the angular aperture based on equation (2) as described in connection with FIG. 4.

The view angle image generating module 503 may be configured to generate a view angle image. The view angle image generating module 503 may generate a view angle image based on angular aperture information and orientation information. The view angle image generating module 503 may be the same as, part of, or different from the first generating module 402 and/or the second generating module 407.

In some embodiments, the view angle image generating module 503 may determine a change of orientation information and/or angular aperture information. The view angle image generating module 503 may determine the change by performing one or more functions of the judgment module 406. In some embodiments, the view angle image generating module 503 may judge whether the change of orientation information and/or angular aperture information is normal or abnormal. The view angle image generating module 503 may determine whether the change of orientation information and/or angular aperture information is normal or abnormal by performing one or more functions of the judgment module 406. Details regarding to the normal change and the abnormal change may be described elsewhere in the present disclosure (e.g., in connection with FIG. 4).

The video-taping module 504 may be configured to generate one or more videos. In some embodiments, the video-taping module 504 may include one or more components configured to convert optical signals into electrical signals and process the electrical signals. The one or more components may include a charge-coupled device (CCD), a complementary metal-oxide-semiconductor (CMOS) sensor, an N-type metal-oxide-semiconductor (NMOS), a contact image sensor (CIS), and/or any suitable image sensor.

The image reconstruction module 505 may be configured to reconstruct a video and to generate a reconstructed video. The image reconstruction module 505 may generate a reconstructed video based on a video (e.g., generated by the video-taping module 504) and a view angle image (e.g., generated by the angular aperture video-taping generating module 503). The image reconstruction module 505 may be the same as, part of, or different from the first reconstruction module 403 and/or the second reconstruction module 408.

The output module 506 may be configured to output information. The information may include information of one or more operation parameters, a view angle image, a video, a reconstructed video. For example, the output module 506 may transmit the reconstructed video to the user terminal 130, the storage 150, and/or any other device associated with the camera system 100. In some embodiments, the output module 506 may be the same as, part of, or different from the output module 404. In some embodiments, the output module 506 may transmit information to any device in the system 100 via a suitable communication protocol (e.g., the Hypertext Transfer Protocol (HTTP), Address Resolution Protocol (ARP), Dynamic Host Configuration Protocol (DHCP), File Transfer Protocol (FTP), etc.).

The modules in the camera 140 may be electronically connected to each other so as to communicate with each other via electronic signals. Further, two or more of the modules may be combined into a single module, and any one of the modules may be divided into two or more units. For example, the orientation detection module 501 and the angular aperture obtaining module 502 may be combined as a single module which may both acquire orientation information and angular aperture information. As another example, the camera 140 may further include a storage module (not shown) configured to store information (e.g., angular aperture information, orientation information, a video, a reconstructed video).

It should be noted that, in some embodiments, the processor 112 may include one or more modules described above (i.e., in connection with FIG. 5 and the description thereof). For example, the processor 112 may include the orientation detection module 501. As another example, the processor 112 may include all the modules mentioned above.

It should be noted that, in some embodiments, the processor 112 may be independent from the camera 140. For example, the processor 112 and the camera 140 may communicate with each other via a wired connection or a wireless connection. In some embodiments, the processor 112 may be part of the camera 140. For example, the processor 112 may be a component configured in the camera 140.

Figure 6:
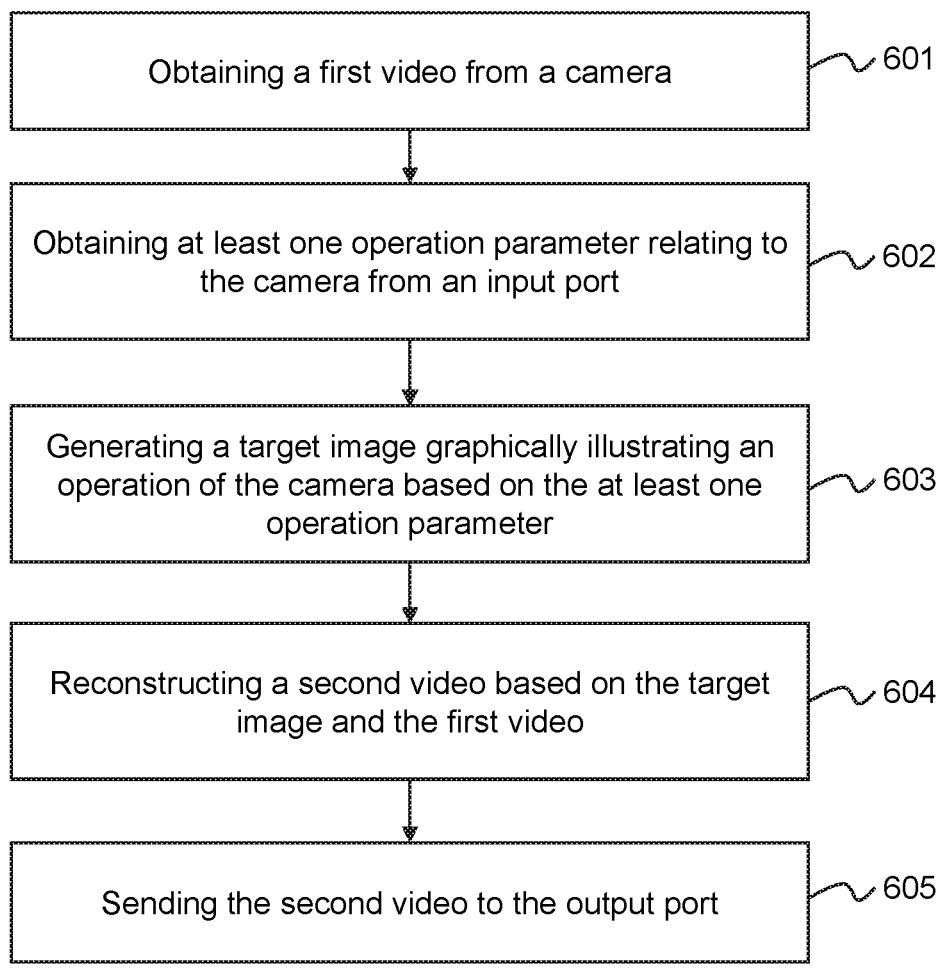
FIG. 6 is a flowchart illustrating an exemplary process for video processing associated with one or more operation parameters according to some embodiments of the present disclosure.

Purely for illustration purpose, in the present application, the method/process in FIG. 6 may be implemented as a set of instruction in the camera 140 and be executed by the video processor of the camera 140. One of ordinary skill in the art would understand at the time of filing of this application, however, the method/process in FIG. 6 may also be implemented in the processor 112. In this scenario, the server 110 may communicate with the camera 140, as shown in FIG. 1, and receive videos recorded by the camera 140. The processor 112 then may execute the set of instructions stored in the memory of the server 110 to perform the method/process.

FIG. 6 is a flowchart illustrating an exemplary process for video processing associated with the one or more camera operation parameters according to some embodiments of the present disclosure. When the camera 140 is recording a video, the process 600 may be performed. The process 600 may be executed by the camera system 100. For example, the process 600 may be implemented on the processor 112 and/or the camera 140. The operations of the illustrated process presented below are intended to be illustrative.

In 601, the camera 140 may obtain a first video. The obtaining may be performed by the obtaining module 401 of the processor 112. The first video may refer to a frame of a video or a video clip. The first video may be generated by the video-taping module 504 of the camera 140.

In 602, at least one operation parameter relating to the camera 140 may be obtained from an input port. The obtaining may be performed by the obtaining module 401 of the processor 112, or the orientation detection module 501 and/or the angular aperture obtaining module 502 of the camera 140. The input port may refer to an input port of modules mentioned above. An operation parameter may include an angular aperture, an orientation, etc.

In 603, a target image graphically illustrating an operation of the camera 140 may be generated based on the at least one operation parameter. The generation may be performed by the first generating module 402 and/or the second generating module 407 of the processor 112, or a view angle image generating module 503 of the camera 140. The target image may refer to a view angle image. The operation of the camera 140 may refer to an operation to change the at least one operation parameter, for example, an orientation, an angular aperture of the camera 140. Details regarding the generation of the target image may be found in connection with FIGS. 12, 15, and 21 and their respective descriptions.

In 604, a second video may be reconstructed based on the target image and the first video. The reconstruction may be performed by the first reconstruction module 403 and/or the second reconstruction module 408 of the processor 112, or the image reconstruction module 505 of the camera 140. In some embodiments, the second video may be reconstructed by combining the target image and the first video.

In 605, the second video may be sent to the output port. The sending may be performed by the output module 404 of the processor 112, the output module 506 of the camera 140. In some embodiments, the output module 404 may send the second video to the user terminal 130, the storage 150, etc.

Figure 7:
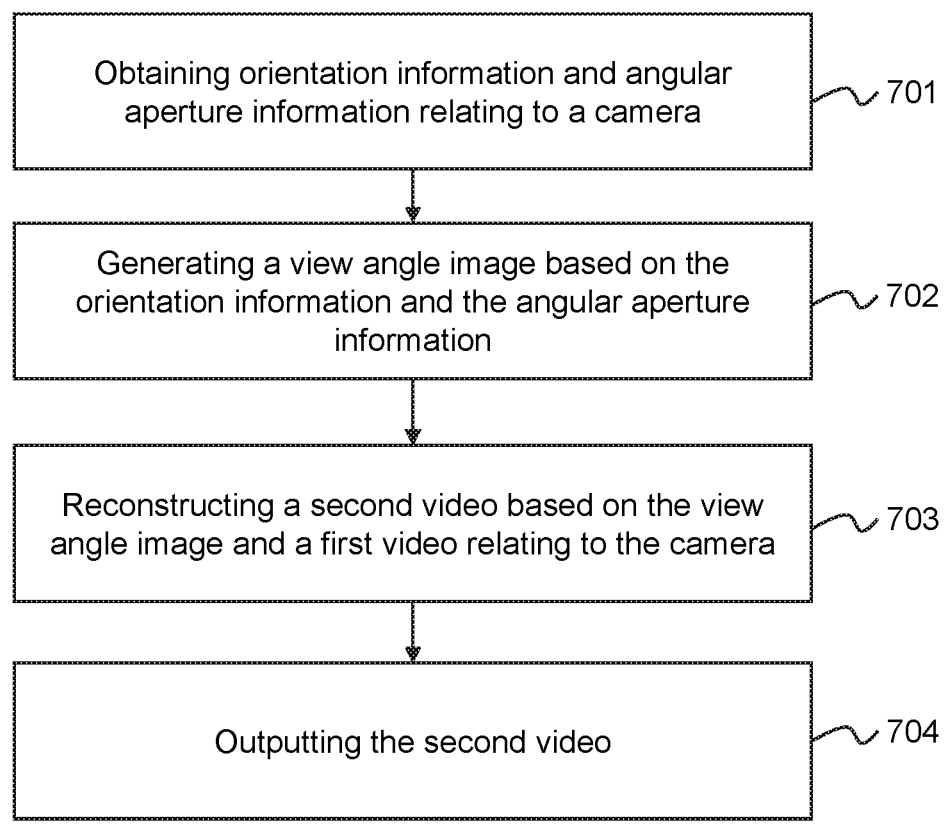
FIG. 7 is a flowchart illustrating an exemplary process for video processing associated with angular aperture information and orientation information according to some embodiments of the present disclosure.

Purely for illustration purpose, in the present application, the method/process in FIG. 7 may be implemented as a set of instruction in the camera 140 and be executed by the video processor of the camera 140. One of ordinary skill in the art would understand at the time of filing of this application, however, the method/process in FIG. 7 may also be implemented in the processor 112. In this scenario, the server 110 may communicate with the camera 140, as shown in FIG. 1, and receive videos recorded by the camera 140. The processor 112 then may execute the set of instructions stored in the memory of the server 110 to perform the method/process.

FIG. 7 is a flowchart illustrating an exemplary process for video processing associated with angular aperture information and orientation information according to some embodiments of the present disclosure. When the camera 140 is video-taping, the process 700 may be performed. The process 700 may be executed by the camera system 100. For example, the process 700 may be implemented in the processor 112 and/or the camera 140. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 701, orientation information and angular aperture information relating to the camera 140 may be obtained. The obtaining may be performed by the obtaining module 401 of the processor 112, or the orientation detection module 501 and/or the angular aperture obtaining module 502 of the camera 140. In some embodiments, the angular aperture of the camera 140 may be obtained according to equation (2) as described in connection with FIG. 4.

In 702, a view angle image may be generated based on the orientation information and the angular aperture information. The generation may be performed by the first generating module 402 and/or the second generating module 407 of the processor 112, or a view angle image generating module 503 of the camera 140. Details regarding the generation of the target image may be found in connection with FIGS. 12, 15, 21.

In 703, a second video may be reconstructed based on the view angle image and a first video relating to the camera 140. The reconstruction may be performed by the first reconstruction module 403 and/or the second reconstruction module 408 of the processor 112, or the image reconstruction module 505 of the camera 140. The second video may be reconstructed by combining the view angle image and the first video. In some embodiments, the combination may be implemented through On Screen Display (OSD) techniques. The On Screen Display techniques may display contents of one or more images (e.g., the view angle image and the video). In some embodiments, the combination may be implemented on the processor 112 and/or the camera 140. The processor 112 and/or the camera 140 may include an external memory or an internal row cache memory.

The second video may include the content of the first image and the content of the view angle image. The content of the first image and the content of the view angle image may locate at different regions of the second video. For example, the content of the first video may locate at the center of the second video, and the content of the view angle image may locate at the top left corner, the top right corner, the bottom left corner, the bottom right corner, the middle left side, the middle right side of the second video.

Figure 10:
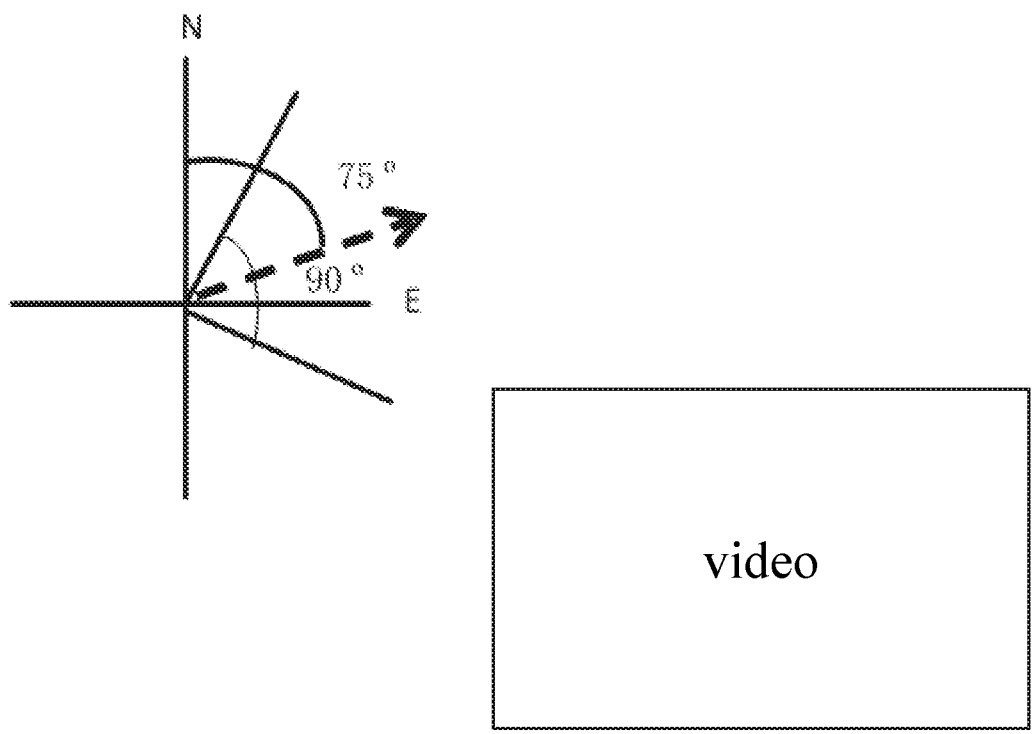
FIG. 10 is a schematic diagram illustrating an exemplary video according to some embodiments of the present disclosure.

FIG. 10 is a schematic diagram illustrating an exemplary second video according to some embodiments of the present disclosure. As illustrated in FIG. 10, the second video may include the content of the first video (e.g., an original video) and the content of a view angle image. The first video locates at the center of the second video. The view angle image locates at the top left corner of the second video. The first video and the view angle image does not overlap.

In 704, the second video may be output. The outputting may be performed by the output module 404 of the processor 112, the output module 506 of the camera 140. In some embodiment, the second video may be output to the storage 150. In some embodiment, the second video may be output to the user terminal 130 to display directly.

Figure 11:
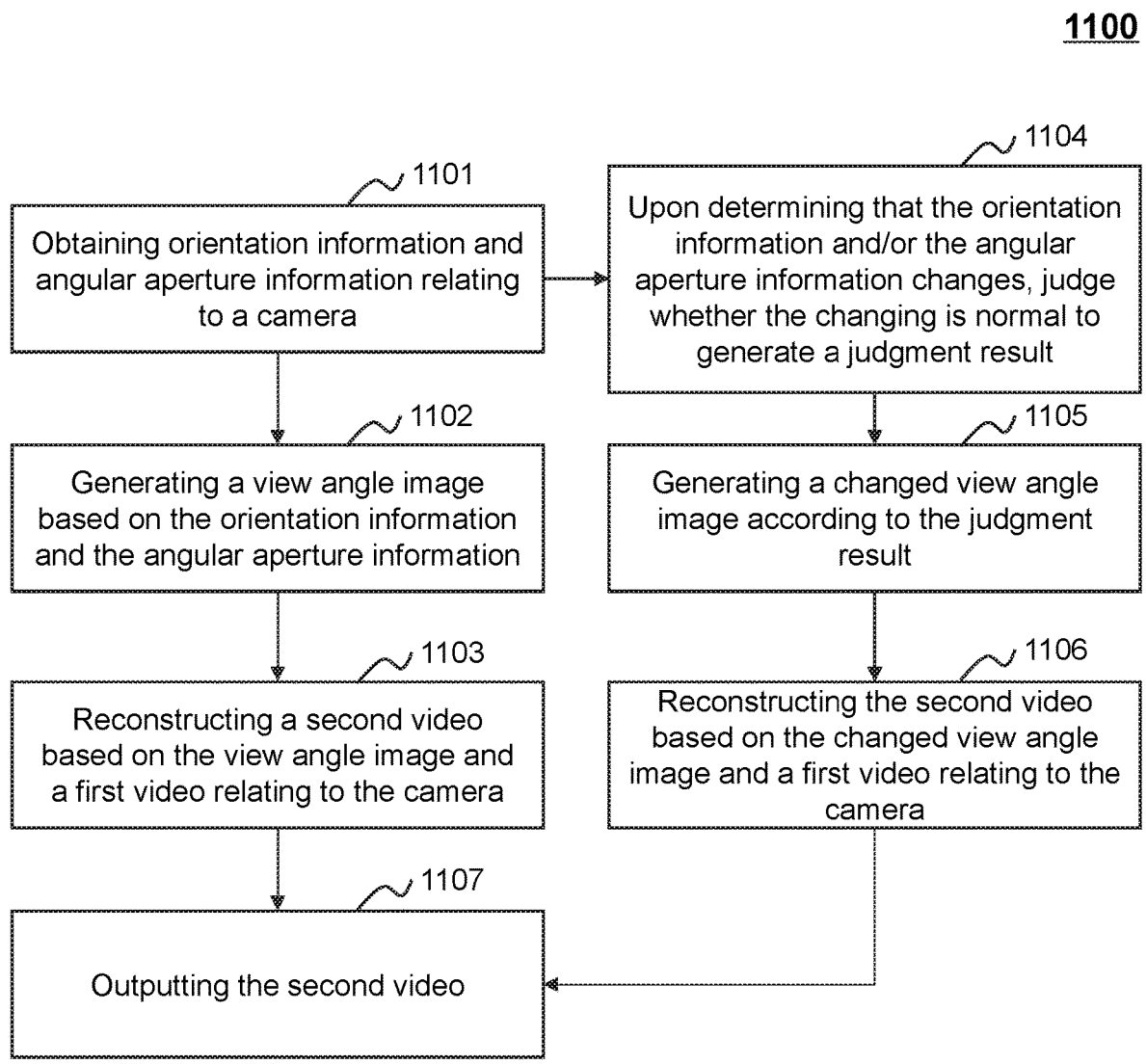
FIG. 11 is a flowchart illustrating an exemplary process for reconstructing a video based on a view angle image according to some embodiments of the present disclosure.

Purely for illustration purpose, in the present application, the method/process in FIG. 11 may be implemented as a set of instruction in the camera 140 and be executed by the video processor of the camera 140. One of ordinary skill in the art would understand at the time of filing of this application, however, the method/process in FIG. 11 may also be implemented in the processor 112. In this scenario, the server 110 may communicate with the camera 140, as shown in FIG. 1, and receive videos recorded by the camera 140. The processor 112 then may execute the set of instructions stored in the memory of the server 110 to perform the method/process.

FIG. 11 is a flowchart illustrating an exemplary process for reconstructing a video based on a view angle image according to some embodiments of the present disclosure. When the camera 140 is video-taping, the process 1100 may be performed. The process 1100 may be executed by the camera system 100. For example, the process 1100 may be implemented on the processor 112 and/or the camera 140. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1101, information of operation parameters (e.g., orientation information and/or angular aperture information) relating to the camera 140 may be obtained. The obtaining may be performed by the obtaining module 401 of the processor 112, or the orientation detection module 501 and/or the angular aperture obtaining module 502 of the camera 140. Further, the information of the operation parameters may be obtained through an input port of the above modules.

In 1102, a view angle image (i.e., a target image) may be generated based on the information of the operation parameters (e.g., the orientation information and/or the angular aperture information). The generation may be performed by the first generating module 402 and/or the second generating module 407 of the processor 112, or a view angle image generating module 503 of the camera 140. The view angle image or target image may show the information of the operation parameters to graphically illustrate the operation of the camera 140. For example, the view angle image may graphically illustrates the orientation of the camera 140 and/or the view angle of the camera 140. Details regarding to the generation of the view angle image may be found in connection with FIGS. 12, 15, 21.

In 1103, a second video may be reconstructed based on the view angle image and a first video relating to the camera 140. The reconstruction may be performed by the first reconstruction module 403 and/or the second reconstruction module 408 of the processor 112, or the image reconstruction module 505 of the camera 140.

Further, process 1100 may determine whether the information of the operation parameters (e.g., the orientation information and/or the angular aperture information) changes. The determination of the changing may be performed by the detection module 405 of the processor 112 or the view angle image generating module 503 of the camera 140. Upon determining that the information of the operation parameters (e.g., the orientation information and/or the angular aperture information) does not change, process 1100 may proceed to 1107 and output the second view angle image.

In 1104, upon determining that the information of the operation parameters (e.g., the orientation information and/or the angular aperture information) changes, whether the changing is normal may be judged and/or determined, and a judgment result may be generated. The judgment of the changing may be performed by the judgment module 406 of the processor 112, or the view angle image generating module 503 of the camera 140. For example, by comparing the operation parameter at two different time points and determining that a change of the operation parameter is greater than a threshold value or substantially different from expected change (e.g., according to a prior operation instruction sent to the camera), the processor and/or the module may determine that the operation of the camera is abnormal (i.e., the camera is in a predetermined operation status).

In 1105, a changed view angle image may be generated according to the judgment result. The generation may be performed by the first generating module 402 and/or the second generating module 407 of the processor 112, or the view angle image generating module 503 of the camera 140. The changed view angle image may graphically illustrate the current information of the operation parameter and/or the change of the operation parameter. For example, if the judgment result is normal, the changed angular aperture may be generated based on the orientation information and/or the angular aperture information after changing. If the judgment result is abnormal, the changed angular aperture may be generated based on the orientation information and/or the angular aperture information before changing and after changing. Additionally, the camera system 100 may also output a notification to notify the changing is abnormal. For example, the processor 112 and/or the camera 140 may generate the notification and transmit the notification to the user terminal 130.

In 1106, a second video may be reconstructed based on the changed view angle image and a first video relating to the camera 140. The reconstruction may be performed by the first reconstruction module 403 and/or the second reconstruction module 408 of the processor 112, or the image reconstruction module 505 of the camera 140.

In 1107, the second video may be output. In some embodiment, the second video may be output to the storage 150. In some embodiment, the second video may be output to the user terminal 130 to display directly.

Figure 12:
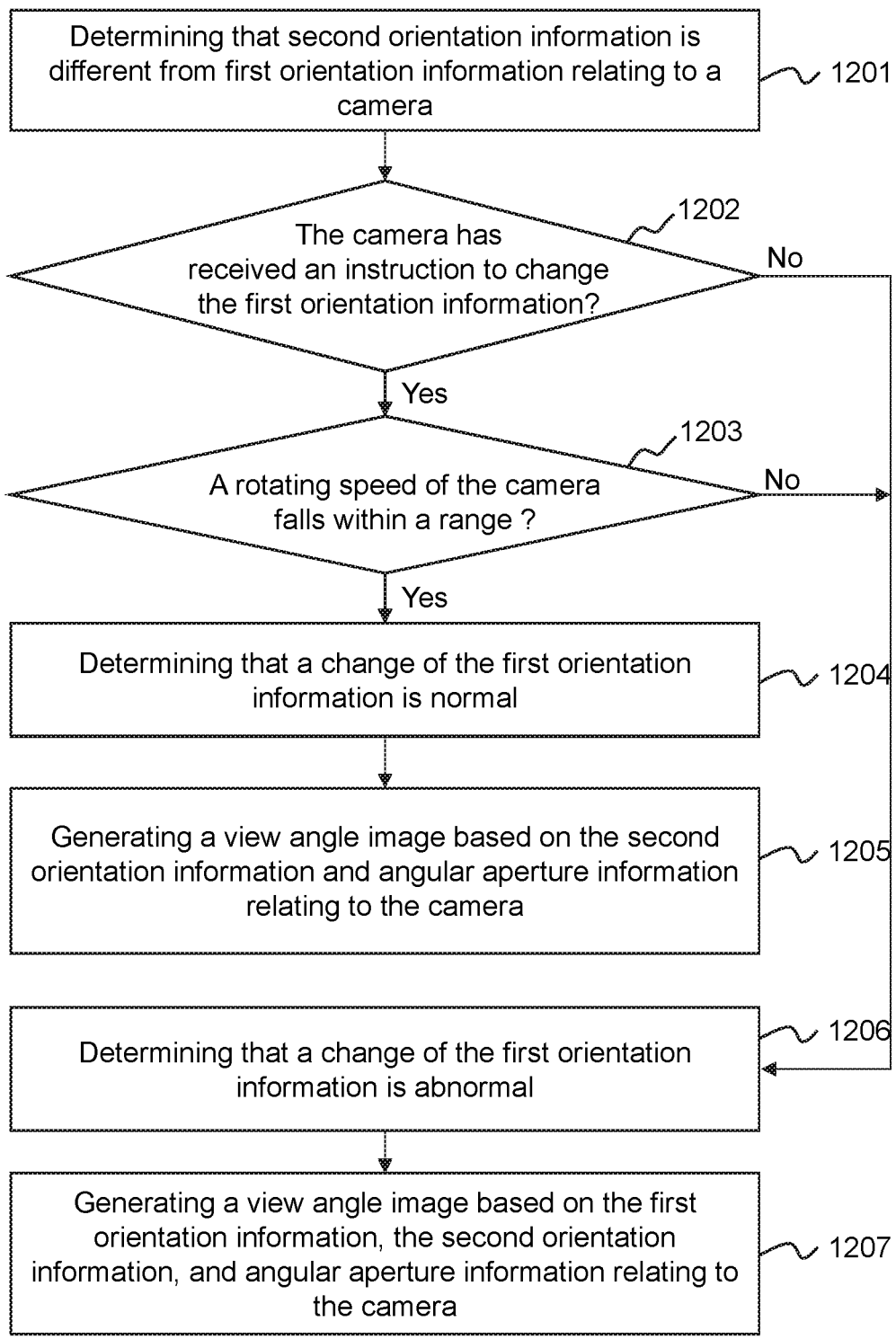
FIG. 12 is a flowchart illustrating an exemplary process for reconstructing a video based on orientation information according to some embodiments of the present disclosure.

Purely for illustration purpose, in the present application, the method/process in FIG. 12 may be implemented as a set of instruction in the camera 140 and be executed by the video processor of the camera 140. One of ordinary skill in the art would understand at the time of filing of this application, however, the method/process in FIG. 12 may also be implemented in the processor 112. In this scenario, the server 110 may communicate with the camera 140, as shown in FIG. 1, and receive videos recorded by the camera 140. The processor 112 then may execute the set of instructions stored in the memory of the server 110 to perform the method/process.

FIG. 12 is a flowchart illustrating an exemplary process for reconstructing a video based on orientation information according to some embodiments of the present disclosure. When detecting whether orientation information of the camera 140 changes, the process 1200 may be performed. When the camera 140 is video-taping, the process 1200 may be performed. The process 1200 may be executed by the camera system 100. For example, the process 1200 may be implemented on the processor 112 and/or the camera 140. The operations of the illustrated process presented below are intended to be illustrative. In some embodiments, the process 1200 may be accomplished with one or more additional operations not described and/or without one or more of the operations discussed. Additionally, the order in which the operations of the process as illustrated in FIG. 12 and described below is not intended to be limiting.

In 1201, occurrence of a change of the information of the operation parameters is determined. For example the second orientation information is different from first orientation information relating to the camera 140 may be determined. The determination may be performed by the detection module 405 of the processor 112, or the view angle image generating module 503 of the camera 140. The first orientation information may refer to orientation information corresponding to a first time point (e.g., the orientation information before changing). The second orientation information may refer to orientation information corresponding to a second time point (e.g., the orientation information after changing).

In 1202, whether the camera 140 has received an instruction associated with the change of the operation parameter is determined. For example, whether the camera 140 has received an instruction to change the first orientation information may be judged. The judgment may be performed by the judgment module 406 of the processor 112, or the view angle image generating module 503 of the camera 140. The instruction may include a specific orientation that the camera 140 should turn to, or a form of instruction indicating desired orientation information after the change, and/or a variation between the first orientation information and desired orientation information, etc. In some embodiments, the instruction may be generated according to an operation of a user, system settings, a program, etc. In some embodiments, the instruction may be transmitted from the user terminal 130, the processor 112, the camera 140, or other device connected with the camera 100.

Upon the judgment and/or determination that the camera 140 has not received an instruction to change the operation parameter (e.g., the first orientation information), process 1200 may proceed to 1206. Upon the judgment that the camera 140 has received an instruction to change the operation parameter (e.g., the first orientation information), process 1200 may proceed to 1203.

In 1203, whether the camera responded to the instruction to substantially achieve the change of the at least one operation parameter is determined. For example, whether a rotating speed of the camera 140 falls within a range may be judged and/or determined. The judgment may be performed by the judgment module 406 of the processor 112, or the view angle image generating module 503 of the camera 140. The range may be set manually by a user or automatically by, for example, the user terminal 130, the camera 140, the processor 112, etc. Upon the judgment that the rotating speed of the camera 140 does not fall within the range, process 1200 may proceed to 1206. Upon the judgment that the rotating speed of the camera 140 falls within the range, process 1200 may proceed to 1204.

In 1204, that a change of the operation parameter (e.g., the first orientation information) is normal may be determined when the camera respond to the instruction to substantially achieve the change of the at least one operation parameter. The determination may be performed by the judgment module 406 of the processor 112, or the view angle image generating module 503 of the camera 140.

In 1205, a view angle image may be generated based on the current operation parameter at the second time point (e.g., the second orientation information and angular aperture information relating to the camera 140). The generation may be performed by the first generating module 402 and/or the second generating module 407 of the processor 112, or a view angle image generating module 503 of the camera 140. The angular aperture information may correspond to a same time point with the second orientation information (i.e. the second time point illustrated in step 1201).

Figure 14:
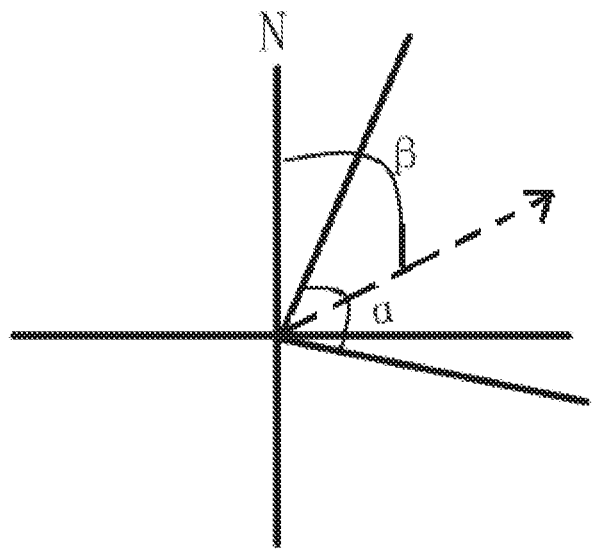
FIG. 14 is a schematic diagram illustrating an exemplary view angle image when detecting a change of orientation information is normal according to some embodiments of the present disclosure.

FIG. 14 is a schematic diagram illustrating an exemplary view angle image generated in step 1205. As illustrated in FIG. 14, the view angle image include a geographical location coordinates including a north direction (represented by N), an east direction, a south direction, and a west direction. $\alpha$ may refer to an angular aperture of the camera 140, i.e., the angular aperture information. $\beta$ may refer to an orientation of the camera 140, i.e., the second orientation information. The dotted arrow may refer to a video-taping direction, locating at the angle bisector of $\alpha$.

In 1206, that a change of the operation parameter (e.g., the first orientation information) is abnormal, i.e., the camera is in a predetermined operation status, may be determined when the camera did not respond to the instruction to substantially achieve the change of the operation parameter. The determination may be performed by the judgment module 406 of the processor 112 or the view angle image generating module 503 of the camera 140.

In 1207, the view angle image is generated to graphically illustrate the change of the operation parameter between the first time point and the second time point. For example, a view angle image may be generated based on the first orientation information, the second orientation information, and angular aperture information relating to the camera 140. The generation may be performed by the first generating module 402 and/or the second generating module 407 of the processor 112, or a view angle image generating module 503 of the camera 140. The angular aperture information may correspond to a same time point with the second orientation information (i.e. the second time point illustrated in step 1201).

Figure 13:
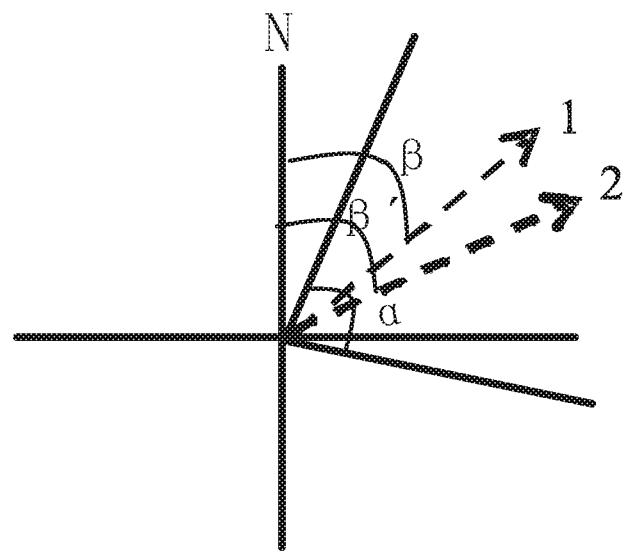
FIG. 13 is a schematic diagram illustrating an exemplary view angle image when detecting a change of orientation information is abnormal according to some embodiments of the present disclosure.

FIG. 13 is a schematic diagram illustrating an exemplary view angle image generated in step 1207. As illustrated in FIG. 13, the view angle image include a geographical location coordinates including a north direction (represented by N), an east direction, a south direction, and a west direction. $\alpha$ may refer to an angular aperture of the camera 140, i.e., the angular aperture information. $\beta$ may refer to an orientation of the camera 140 at a first time point, i.e., the first orientation information. $\beta$ may also refer to an orientation of the camera 140 before changing. $\beta'$ may refer to an orientation of the camera 140 at a second time point, i.e., the second orientation information. $\beta'$ may also refer to an orientation of the camera 140 after changing. The dotted arrow "1" may refer to a video-taping direction corresponding to the first time point. The dotted arrow "2" may refer to a video-taping direction corresponding to the second time point, locating at the angle bisector of $\alpha$.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in 1203, process 1200 may not judge whether a rotating speed of the camera 140 falls within a range, and may judge whether the second orientation information satisfies a specific orientation indicated by the instruction received by the camera 140. More particularly, process 1200 may compare the second orientation information with the specific orientation. Upon determining that a difference between the second orientation information and the specific orientation is less than a threshold, process 1200 may judge that the second orientation information satisfies the specific orientation and proceed to 1204. On the other hand, upon determining that a difference between the second orientation information and the specific orientation is not less than the threshold, process 1200 may judge that the second orientation information does not satisfy the specific orientation and proceed to 1206.

Figure 15:
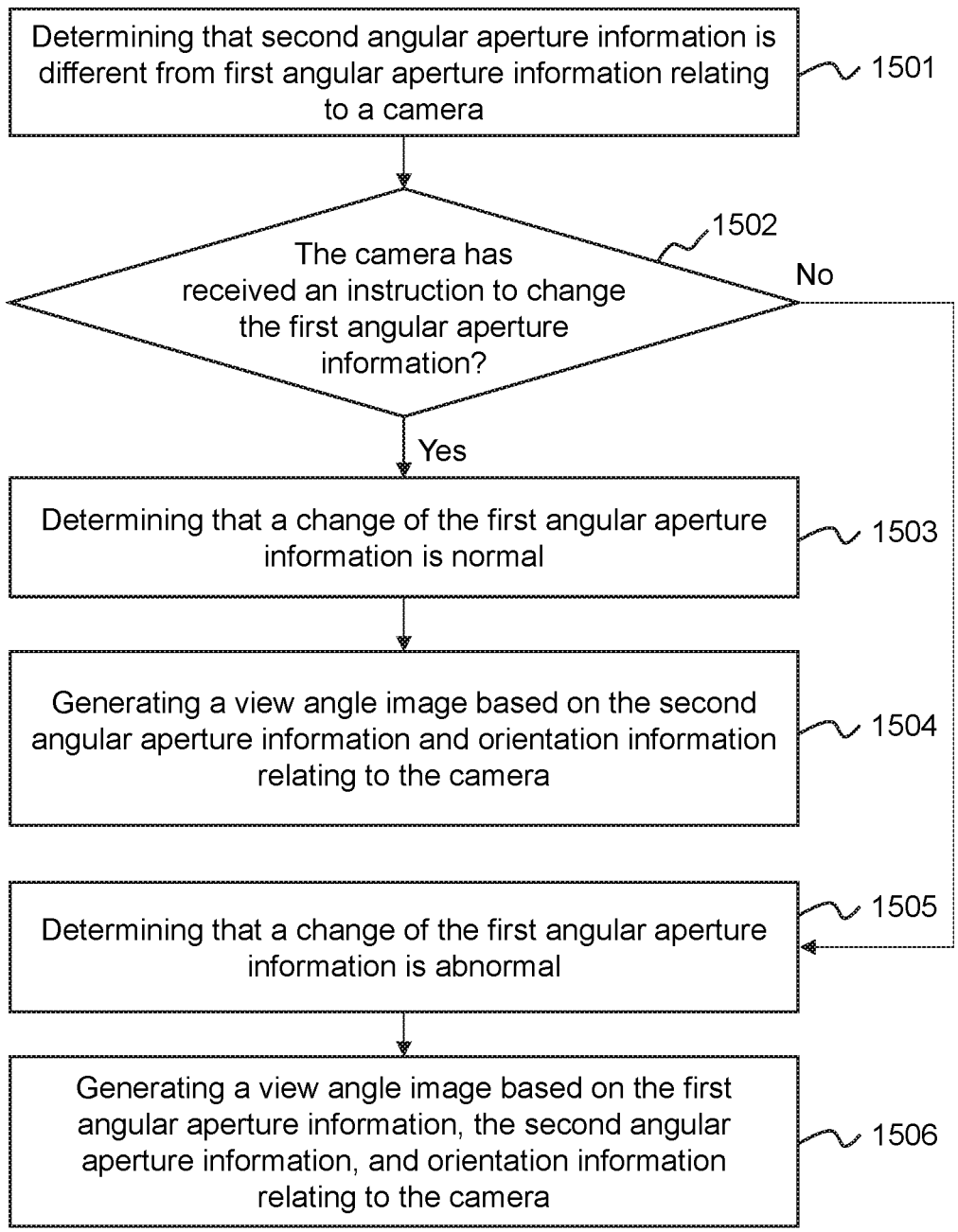
FIG. 15 is a flowchart illustrating an exemplary process for reconstructing a video based on angular aperture information according to some embodiments of the present disclosure.

Purely for illustration purpose, in the present application, the method/process in FIG. 15 may be implemented as a set of instruction in the camera 140 and be executed by the video processor of the camera 140. One of ordinary skill in the art would understand at the time of filing of this application, however, the method/process in FIG. 15 may also be implemented in the processor 112. In this scenario, the server 110 may communicate with the camera 140, as shown in FIG. 1, and receive videos recorded by the camera 140. The processor 112 then may execute the set of instructions stored in the memory of the server 110 to perform the method/process.

FIG. 15 is a flowchart illustrating an exemplary process for reconstructing a video based on angular aperture information according to some embodiments of the present disclosure. When detecting whether angular aperture information of the camera 140 changes, the process 1500 may be performed. When the camera 140 is video-taping, the process 1500 may be performed. The process 1500 may be executed by the camera system 100. For example, the process 1500 may be implemented on the processor 112 and/or the camera 140. The operations of the illustrated process presented below are intended to be illustrative. In some embodiments, the process 1500 may be accomplished with one or more additional operations not described and/or without one or more of the operations discussed. Additionally, the order in which the operations of the process as illustrated in FIG. 15 and described below is not intended to be limiting.

In 1501, occurrence of a change of the information of the operation parameters is determined. For example, that second angular aperture information is different from first angular aperture information relating to the camera 140 may be determined. The determination may be performed by the detection module 405 of the processor 112, or the view angle image generating module 503 of the camera 140. The first angular aperture information may refer to angular aperture information corresponding to a first time point (e.g., the angular aperture information before changing). The second angular aperture information may refer to angular aperture information corresponding to a second time point (e.g., the angular aperture information after changing).

In 1502, whether the camera responded to the instruction to substantially achieve the change of the at least one operation parameter is determined. For example, whether the camera 140 has received an instruction to change the first angular aperture information may be judged and/or determined. The judgment may be performed by the judgment module 406 of the processor 112, or the view angle image generating module 503 of the camera 140. The instruction may include a specific angular aperture that the camera 140 should reach, or a form of instruction indicating desired angular aperture information after changing, and/or a variation between the first angular aperture information and desired angular aperture information, etc. In some embodiments, the instruction may be generated according to an operation of a user, system settings, a program, etc. In some embodiments, the instruction may be transmitted from the user terminal 130, the processor 112, the camera 140, or other device connected with the camera 100.

Upon the determination and/or judgment that the camera 140 has not received the instruction to change the operation parameter (e.g., the first angular aperture information), process 1500 may proceed to 1505. Upon the determination and/or judgment that the camera 140 has received the instruction to change the operation parameter (e.g., the first angular aperture information), process 1500 may proceed to 1503.

In 1503, that the change of the operation parameter (e.g., the first angular aperture information) is normal may be determined. The determination may be performed by the judgment module 406 of the processor 112 or the view angle image generating module 503 of the camera 140.

In 1504, the view angle image is generated to graphically illustrate the change of the operation parameter between the first time point and the second time point. For example, a view angle image may be generated based on the second angular aperture information and orientation information relating to the camera 140. The generation may be performed by the first generating module 402 and/or the second generating module 407 of the processor 112, or a view angle image generating module 503 of the camera 140. The orientation information may correspond to a same time point with the second angular aperture information (i.e. the second time point illustrated in step 1501).

Figure 17:
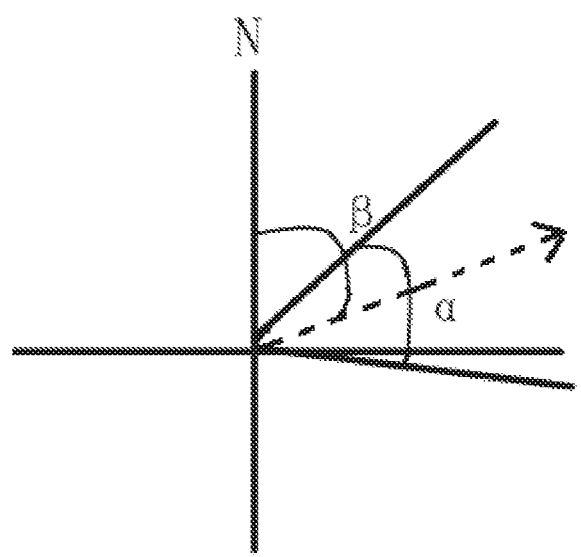
FIG. 17 is a schematic diagram illustrating an exemplary view angle image when detecting a change of angular aperture information is normal according to some embodiments of the present disclosure.

FIG. 17 is a schematic diagram illustrating an exemplary view angle image generated in step 1504. As illustrated in FIG. 17, the view angle image include a geographical location coordinates including a north direction (represented by N), an east direction, a south direction, and a west direction. $\alpha$ may refer to an angular aperture of the camera 140, i.e., the second angular aperture information. $\beta$ may refer to an orientation of the camera 140, i.e., the orientation information. The dotted arrow may refer to a video-taping direction, locating at the angle bisector of $\alpha$.

In 1505, that a change of the operation parameter (e.g., the first angular aperture information) is abnormal, i.e., the camera is in a predetermined operation status, may be determined. The determination may be performed by the judgment module 406 of the processor 112 or the view angle image generating module 503 of the camera 140.

In 1506, the view angle image is generated to graphically illustrate the change of the operation parameter between the first time point and the second time point. For example, a view angle image may be generated based on the first angular aperture information, the second angular aperture information, and orientation information relating to the camera 140. The generation may be performed by the first generating module 402 and/or the second generating module 407 of the processor 112, or a view angle image generating module 503 of the camera 140. The orientation information may correspond to a same time point with the second angular aperture information (i.e. the second time point illustrated in step 1501).

Figure 16:
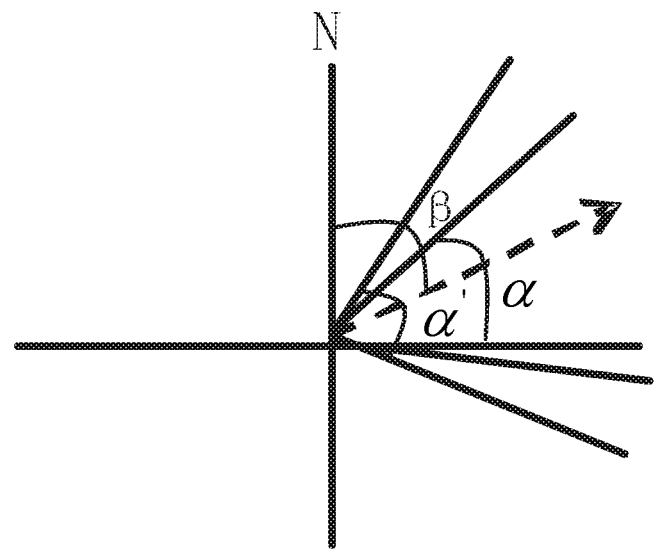
FIG. 16 is a schematic diagram illustrating an exemplary view angle image when detecting a change of angular aperture information is abnormal according to some embodiments of the present disclosure.

FIG. 16 is a schematic diagram illustrating an exemplary view angle image generated in step 1506. As illustrated in FIG. 16, the view angle image include a geographical location coordinates including a north direction (represented by N), an east direction, a south direction, and a west direction. $\alpha$ may refer to an angular aperture of the camera 140 at a first time point, i.e., the first angular aperture information. $\alpha$ may also refer to an angular aperture of the camera 140 before changing. $\alpha'$ may refer to an angular aperture of the camera 140 at a second time point, i.e., the second angular aperture information. $\alpha'$ may also refer to an angular aperture of the camera 140 after changing. $\beta$ may refer to an orientation of the camera 140, i.e., the orientation information. The dotted arrow may refer to a video-taping direction, locating at the angle bisector of $\alpha'$.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, process 1500 may further judge whether the second angular aperture information satisfies a specific angular aperture indicated by the instruction received by the camera 140. More particularly, process 1500 may compare the second angular aperture information with the specific angular aperture. Upon determining that a difference between the second angular aperture information and the specific angular aperture is less than a threshold, process 1500 may judge that the second angular aperture information satisfies the specific angular aperture and proceed to 1503. On the other hand, upon determining that a difference between the second angular aperture information and the specific angular aperture is not less than the threshold, process 1500 may judge that the second angular aperture information does not satisfy the specific orientation and proceed to 1505.

Figure 18:
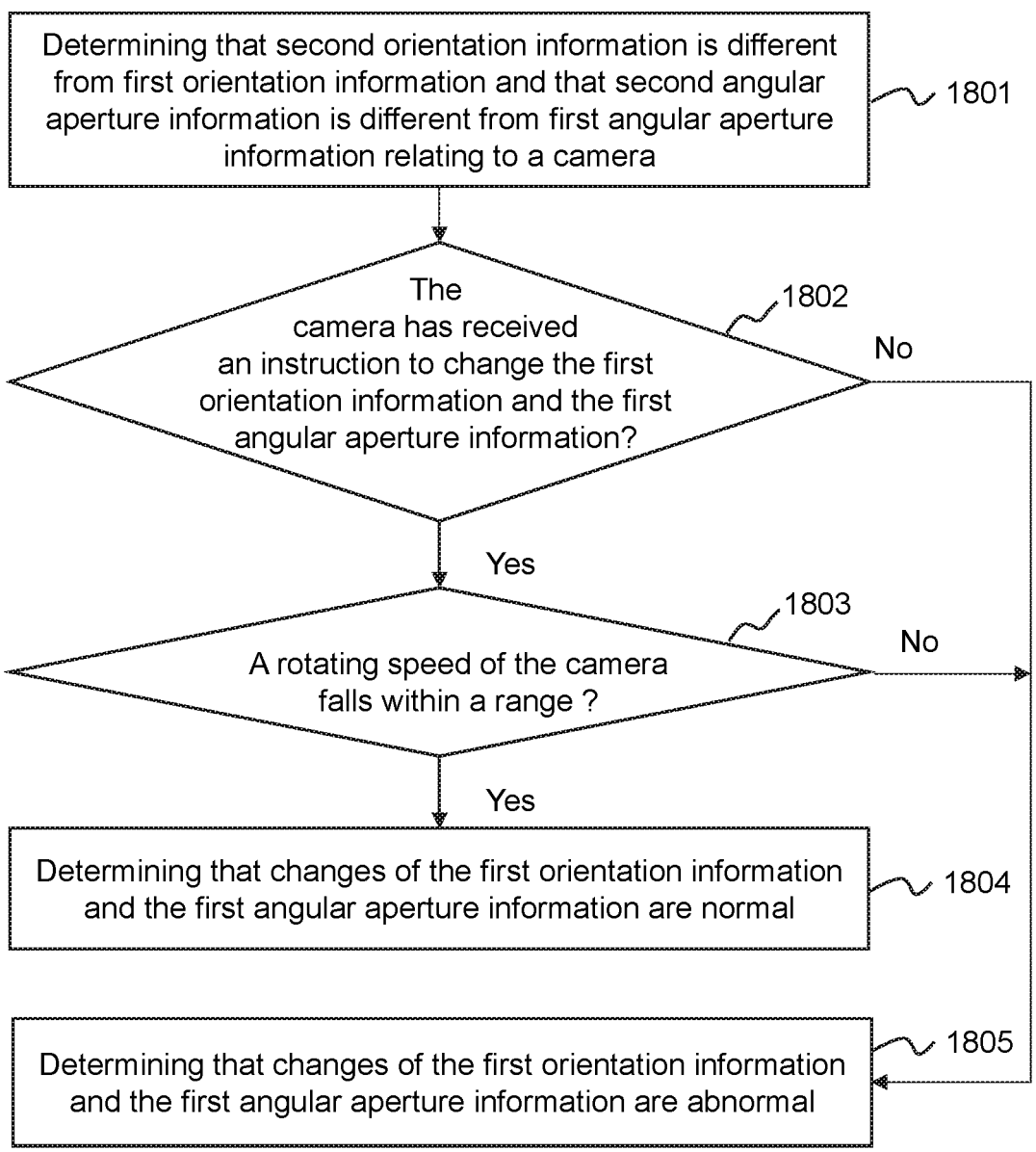
FIG. 18 is a flowchart illustrating an exemplary process for determining whether changes of orientation information and angular aperture information are normal according to some embodiments of the present disclosure.

Purely for illustration purpose, in the present application, the method/process in FIG. 18 may be implemented as a set of instruction in the camera 140 and be executed by the video processor of the camera 140. One of ordinary skill in the art would understand at the time of filing of this application, however, the method/process in FIG. 18 may also be implemented in the processor 112. In this scenario, the server 110 may communicate with the camera 140, as shown in FIG. 1, and receive videos recorded by the camera 140. The processor 112 then may execute the set of instructions stored in the memory of the server 110 to perform the method/process.

FIG. 18 is a flowchart illustrating an exemplary process for determining whether changes of orientation information and angular aperture information are normal according to some embodiments of the present disclosure. When detecting whether angular aperture information and orientation information of the camera 140 changes, the process 1800 may be performed. When the camera 140 is video-taping, the process 1800 may be performed. The process 1800 may be executed by the camera system 100. For example, the process 1800 may be implemented on the processor 112 and/or the camera 140. The operations of the illustrated process presented below are intended to be illustrative. In some embodiments, the process 1800 may be accomplished with one or more additional operations not described and/or without one or more of the operations discussed. Additionally, the order in which the operations of the process as illustrated in FIG. 18 and described below is not intended to be limiting.

In 1801, occurrence of a change of the information of the operation parameters is determined. For example, that second orientation information is different from first orientation information and that second angular aperture information is different from first angular aperture information relating to the camera 140 are determined. The determination may be performed by the detection module 405 of the processor 112, or the view angle image generating module 503 of the camera 140. The first orientation information may refer to orientation information corresponding to a first time point (e.g., the orientation information before changing). The second orientation information may refer to orientation information corresponding to a second time point (e.g., the orientation information after changing). The first angular aperture information may refer to angular aperture information corresponding to the first time point (e.g., the angular aperture information before changing). The second angular aperture information may refer to angular aperture information corresponding to the second time point (e.g., the angular aperture information after changing).

In 1802, whether the camera responded to the instruction to substantially achieve the change of the at least one operation parameter is determined. For example, whether the camera 140 has received an instruction to change the first orientation information and the first angular aperture information may be judged. The judgment may be performed by the judgment module 406 of the processor 112 or the view angle image generating module 503 of the camera 140. In some embodiments, the instruction may include a specific orientation that the camera 140 should turn to, or a form of instruction indicating desired orientation information after the change, and/or a specific angular aperture that the camera 140 should reach, or a form of instruction indicating desired angular aperture information after the change, a variation between the first orientation information and desired orientation information, and/or a variation between the first angular aperture information and desired angular aperture information, etc. In some embodiments, the instruction may be generated according to an operation of a user, system settings, a program, etc. In some embodiments, the instruction may be transmitted from the user terminal 130, the processor 112, the camera 140, or other device connected with the camera 100.

Upon the determination and/or judgment that the camera 140 has not received the instruction change the operation parameter (e.g., the first orientation information and the first angular aperture information), process 1800 may proceed to 1805. Upon the determination and/or judgment that the camera 140 has received the instruction to change the operation parameter (e.g., the first orientation information and the first angular aperture information), process 1800 may proceed to 1803.

In 1803, whether a rotating speed of the camera 140 falls within a range may be judged. In some embodiments, process 1800 may perform one or more operations described in connection with step 1203.

Upon the judgment that the rotating speed of the camera 140 does not fall within a range, process 1800 may proceed to 1805. Upon the judgment that the rotating speed of the camera 140 falls within a range, process 1800 may proceed to 1804.

In 1804, that changes of the operation parameter (e.g., the first orientation information and the first angular aperture information) are normal may be determined. The determination may be performed by the judgment module 406 of the processor 112, or the view angle image generating module 503 of the camera 140.

In 1805, that changes of the operation parameter (e.g., the first orientation information and the first angular aperture information) are abnormal, i.e., the camera is in a predetermined operation status, may be determined. The determination may be performed by the judgment module 406 of the processor 112, or the view angle image generating module 503 of the camera 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in 1803, process 1800 may not judge whether a rotating speed of the camera 140 falls within a range, and may judge whether the second orientation information satisfies a specific orientation indicated by the instruction received by the camera 140. As another example, process 1800 may further judge whether the second angular aperture information satisfies a specific angular aperture indicated by the instruction received by the camera 140. As still another example, in 1802, the camera 140 may receive two instructions. The two instructions may indicate to change the first orientation information and the first angular aperture information respectively.

Figure 21:
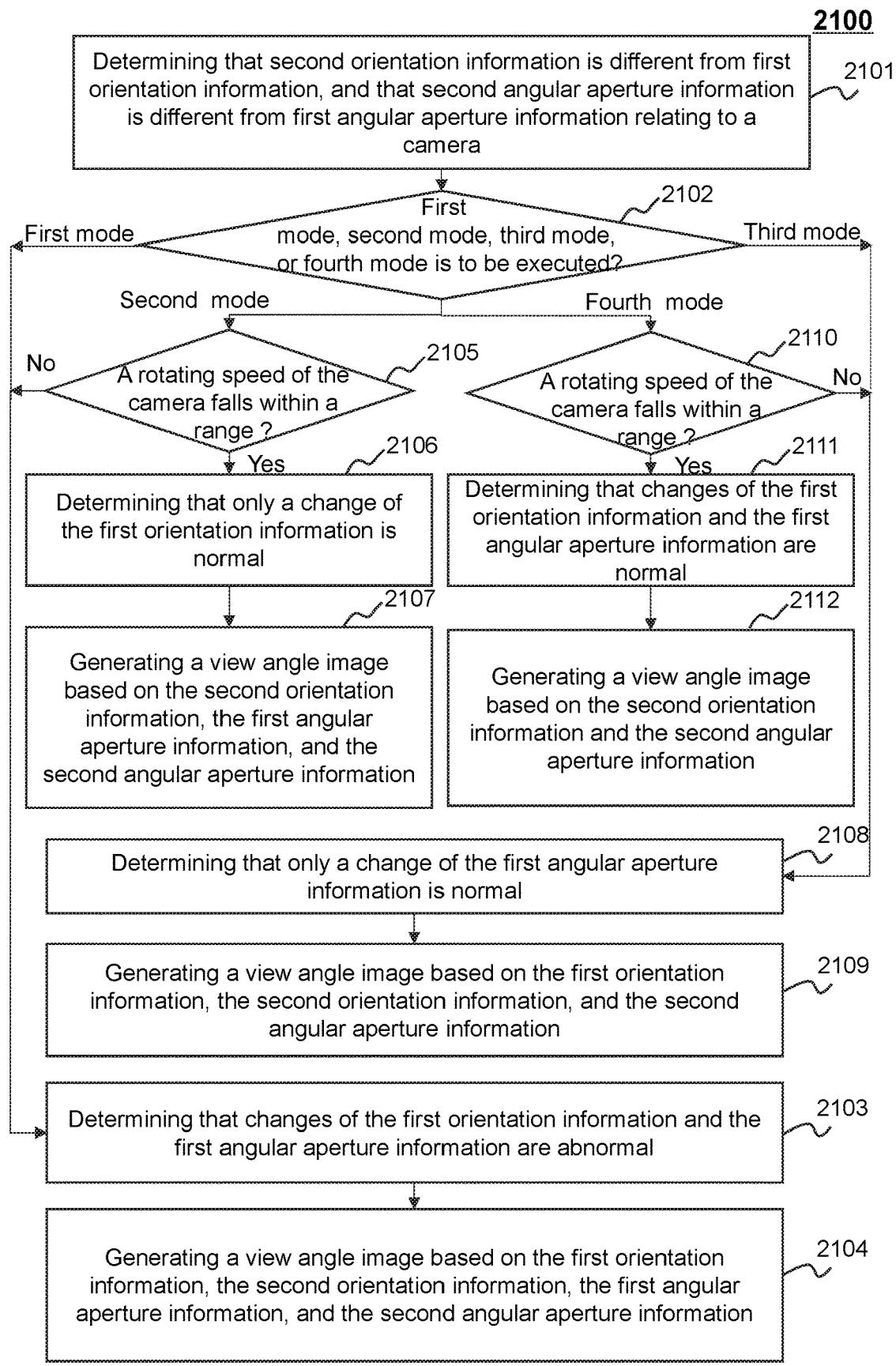
FIG. 21 is a flowchart illustrating an exemplary process for reconstructing a video based on orientation information and angular aperture information according to some embodiments of the present disclosure.

Purely for illustration purpose, in the present application, the method/process in FIG. 21 may be implemented as a set of instruction in the camera 140 and be executed by the video processor of the camera 140. One of ordinary skill in the art would understand at the time of filing of this application, however, the method/process in FIG. 21 may also be implemented in the processor 112. In this scenario, the server 110 may communicate with the camera 140, as shown in FIG. 1, and receive videos recorded by the camera 140. The processor 112 then may execute the set of instructions stored in the memory of the server 110 to perform the method/process.

FIG. 21 is a flowchart illustrating an exemplary process for reconstructing a video based on orientation information and angular aperture information according to some embodiments of the present disclosure. When detecting whether at least one of angular aperture information and orientation information of the camera 140 changes, the process 2100 may be performed. When the camera 140 is video-taping, the process 2100 may be performed. The process 2100 may be executed by the camera system 100. For example, the process 2100 may be implemented on the processor 112 and/or the camera 140. The operations of the illustrated process presented below are intended to be illustrative. In some embodiments, the process 2100 may be accomplished with one or more additional operations not described and/or without one or more of the operations discussed. Additionally, the order in which the operations of the process as illustrated in FIG. 21 and described below is not intended to be limiting.

In 2101, that second orientation information is different from first orientation information, and that second angular aperture information is different from first angular aperture information relating to the camera 140 are determined. In some embodiments, process 2100 may perform one or more operations described in connection with step 1801.

In 2102, first mode, second mode, third mode, or fourth mode is determined to be executed. Upon determining that the camera 140 has not received an instruction to change the first orientation information or the first angular aperture information, the first mode may be executed and process 2100 may proceed to 2103. Upon determining that the camera 140 has received an instruction to change the first orientation information only, the second mode may be executed and process 2100 may proceed to 2105. Upon determining that the camera 140 has received an instruction to change the first angular aperture information only, the third mode may be executed and process 2100 may proceed to 2108. Upon determining that the camera 140 has received an instruction to change both the first orientation information and the first angular aperture information, the forth mode may be executed and process 2100 may proceed to 2110. The determination may be performed by the judgment module 406 of the processor 112 or the view angle image generating module 503 of the camera 140.

In 2103, that changes of the first orientation information and the first angular aperture information are abnormal, i.e., the camera is in a predetermined operation status, is determined. In some embodiments, process 2100 may perform one or more operations described in connection with step 1805.

In 2104, a view angle image may be generated based on the first orientation information, the second orientation information, the first angular aperture information, and the second angular aperture information.

Figure 19:
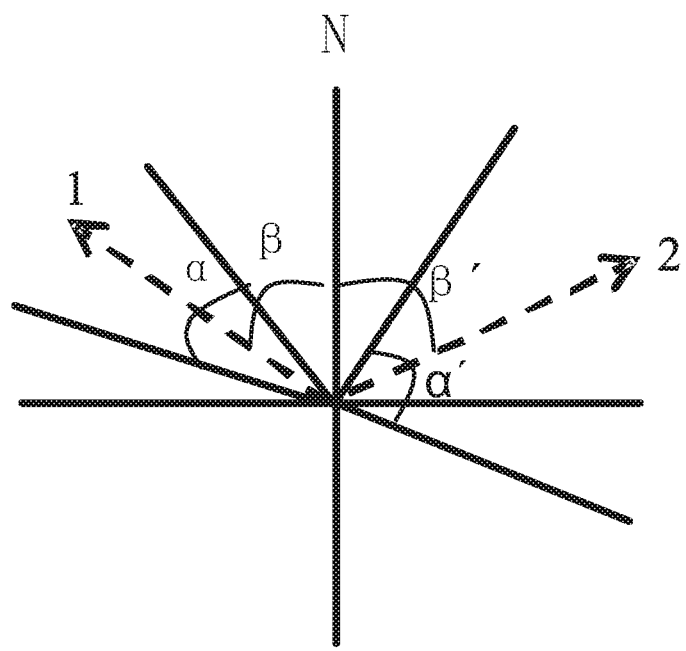
FIG. 19 is a schematic diagram illustrating an exemplary view angle image when detecting changes of orientation information and angular aperture information are abnormal according to some embodiments of the present disclosure.

FIG. 19 is a schematic diagram illustrating an exemplary view angle image generated in step 2104. As illustrated in FIG. 19, the view angle image include a geographical location coordinates including a north direction (represented by N), an east direction, a south direction, and a west direction. $\alpha$ may refer to an angular aperture of the camera 140 at a first time point, i.e., the first angular aperture information. $\alpha$ may also refer to an angular aperture of the camera 140 before changing. $\alpha'$ may refer to an angular aperture of the camera 140 at a second time point, i.e., the second angular aperture information. $\alpha'$ may also refer to an angular aperture of the camera 140 after changing. $\beta$ may refer to an orientation of the camera 140 at a first time point, i.e., the first orientation information. $\beta$ may also refer to an orientation of the camera 140 before changing. $\beta'$ may refer to an orientation of the camera 140 at a second time point, i.e., the second orientation information. $\beta'$ may also refer to an orientation of the camera 140 after changing. The dotted arrow "1" may refer to a video-taping direction corresponding to the first time point, locating at the angle bisector of $\alpha$. The dotted arrow "2" may refer to a video-taping direction corresponding to the second time point, locating at the angle bisector of $\alpha'$.

In 2105, whether a rotating speed of the camera 140 falls within a range may be judged. In some embodiments, process 2100 may perform one or more operations described in connection with step 1203.

In 2106, that only a change of the first orientation information is normal may be determined. The change of the first angular aperture information may be abnormal, i.e., the camera is in a predetermined operation status.

In 2107, a view angle image may be determined based on the second orientation information, the first angular aperture information, and the second angular aperture information. The view angle image may be illustrated in FIG. 16.

In 2108, that only a change of the first angular aperture information is normal may be determined. The change of the first orientation information may be abnormal, i.e., the camera is in a predetermined operation status.

In 2109, a view angle image may be determined based on the first orientation information, the second orientation information, and the second angular aperture information. The view angle image may be illustrated in FIG. 13.

In 2110, whether a rotating speed of the camera 140 falls within a range may be judged. In some embodiments, process 2100 may perform one or more operations described in connection with step 1203.

In 2111, that changes of the first orientation information and the first angular aperture information are normal may be determined.

Figure 20:
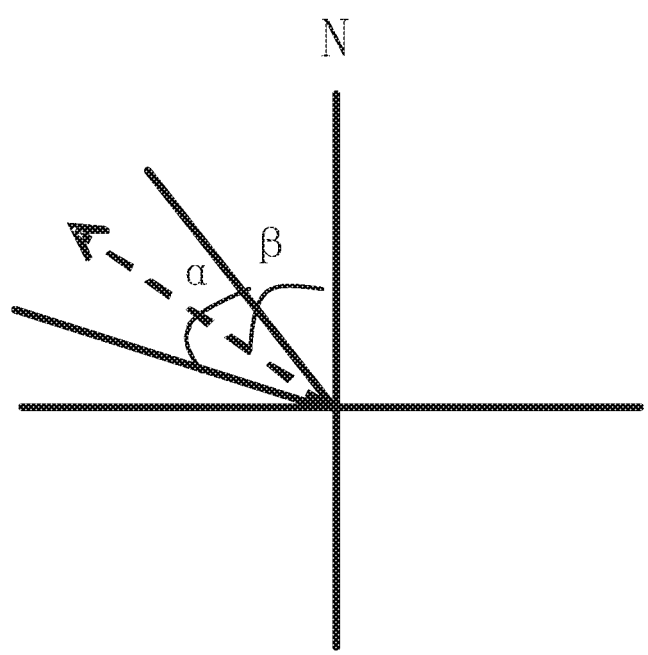
FIG. 20 is a schematic diagram illustrating an exemplary view angle image when detecting changes of orientation information and angular aperture information are normal according to some embodiments of the present disclosure.

In 2112, a view angle image may be determined based on the second orientation information and the second angular aperture information. FIG. 20 is a schematic diagram illustrating an exemplary view angle image generated in step 2112. As illustrated in FIG. 20, the view angle image include a geographical location coordinates including a north direction (represented by N), an east direction, a south direction, and a west direction. $\alpha$ may refer to an angular aperture of the camera 140 at a second time point, i.e., the second angular aperture information. $\beta$ may refer to an orientation of the camera 140 at a second time point, i.e., the second orientation information. The dotted arrow may refer to a video-taping direction corresponding to the second time point, locating at the angle bisector of $\alpha$.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in 2105 and/or 2110, process 2100 may not judge whether a rotating speed of the camera 140 falls within a range, and may judge whether the second orientation information satisfies a specific orientation indicated by the instruction received by the camera 140. As another example, process 2100 may further judge whether the second angular aperture information satisfies a specific angular aperture indicated by the instruction received by the camera 140. As still another example, in 2102, the camera 140 may receive two instructions. The two instructions may indicate to change the first orientation information and the first angular aperture information respectively.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for video processing, comprising:
   an input port configured to receive a first video from a camera;
   an output port configured to output a second video;
   one or more storage media including a set of instructions for modifying the first video;
   one or more video processors including one or more internal cache memory and in communication with the one or more storage media, wherein when executing the set of instructions, the one or more video processors:
      obtain the first video from the camera through the input port;
      obtain at least one operation parameter relating to the camera from the input port, wherein the at least one operation parameter includes an orientation of the camera;
      generate a target image graphically illustrating the orientation of the camera based on the at least one operation parameter, wherein to generate the target image, the one or more video processors:
         determine that the camera is in a predetermined operation status by comparing the at least one operation parameter at a first time point and the at least one operation parameter at a second time point; and
      generate the target image to graphically illustrate a change of the at least one operation parameter including the orientation of the camera between the first time point and the second time point;
      reconstruct the second video by combining based on the target image and the first video; and
      send the second video to an electronic device through the output port.

2. The system of claim 1, wherein the at least one operation parameter includes a view angle of the camera; and the target image graphically illustrates the view angle of the camera.

3. The system of claim 1, wherein the one or more video processors further:
upon determining that the camera is in the predetermined operation status, generate a notification to notify that the camera is in the predetermined operation status.

4. The system of claim 1, wherein to determine that the camera is in the predetermined operation status, the one or more video processors further:
determine that a change occurred between the at least one operation parameter at the first time point and the at least one operation parameter at the second time point;
determine that the camera received no instruction associated with a change of the at least one operation parameter; and
determine that the camera is in the predetermined operation status.

5. The system of claim 1, wherein to determine that the camera is in the predetermined operation status, the one or more video processors further:
determine an actual change between the at least one operation parameter at the first time point and the at least one operation parameter at the second time point;
determine that the camera received an instruction associated with the change of the at least one operation parameter;
determine that the camera did not respond to the instruction to substantially achieve the change of the at least one operation parameter; and
determine that the camera is in the predetermined operation status.

6. A method for video processing implemented on a computing device having at least one processor, at least one computer-readable storage medium, and a communication platform connected to a network, the method comprising:
obtaining a first video from a camera through an input port;
obtaining at least one operation parameter relating to the camera from the input port, wherein the at least one operation parameter includes an orientation of the camera;
generating a target image graphically illustrating the orientation of the camera based on the at least one operation parameter, wherein the generating the target image comprising:
determine that the camera is in a predetermined operation status by comparing the at least one operation parameter at a first time point and the at least one operation parameter at a second time point; and
generate the target image to graphically illustrate a change of the at least one operation parameter including the orientation of the camera between the first time point and the second time point;
reconstructing a second video by combining the target image and the first video; and
sending the second video to an electronic device through an output port.

7. The method of claim 6, wherein the at least one operation parameter includes a view angle of the camera; and the target image graphically illustrates the view angle of the camera.

8. The method of claim 6, further comprising:
upon determining that the camera is in the predetermined operation status, generating a notification to notify that the camera is in the predetermined operation status.

9. The method of claim 6, wherein determining that the camera is in the predetermined operation status comprises:
determining that a change occurred between the at least one operation parameter at the first time point and the at least one operation parameter at the second time point;
determining that the camera received no instruction associated with a change of the at least one operation parameter; and
determining that the camera is in the predetermined operation status.

10. The method of claim 6, wherein determining that the camera is in the predetermined operation status comprises:
determining an actual change between the at least one operation parameter at the first time point and the at least one operation parameter at the second time point;
determining that the camera received an instruction associated with the change of the at least one operation parameter;
determining that the camera did not respond to the instruction to substantially achieve the change of the at least one operation parameter; and
determining that the camera is in the predetermined operation status.

11. A non-transitory computer readable medium embodying a computer program product, the computer program product comprising instructions for video processing configured to cause a computing system to;
obtain a first video from a camera through an input port;
obtain at least one operation parameter relating to the camera from the input port, wherein the at least one operation parameter includes an orientation of the camera;
generating a target image graphically illustrating the orientation of the camera based on the at least one operation parameter, wherein the generating the target image comprising:
determine that the camera is in a predetermined operation status by comparing the at least one operation parameter at a first time point and the at least one operation parameter at a second time point; and
generate the target image to graphically illustrate a change of the at least one operation parameter including the orientation of the camera between the first time point and the second time point;
reconstructing a second video by combining the target image and the first video; and
send the second video to an electronic device through an output port.

12. The non-transitory computer readable medium of claim 11, wherein the at least one operation parameter includes a view angle of the camera; and the target image graphically illustrates the view angle of the camera.

13. The non-transitory computer readable medium of claim 11, wherein the computer program product further comprises instructions configured to cause the computing system to:
upon determining that the camera is in the predetermined operation status, generate a notification to notify that the camera is in the predetermined operation status.

14. The non-transitory computer readable medium of claim 11, wherein the computer program product further comprises instructions configured to cause the computing system to:

determine that a change occurred between the at least one operation parameter at the first time point and the at least one operation parameter at the second time point;

determine that the camera received no instruction associated with a change of the at least one operation parameter; and determine that the camera is in the predetermined operation status.

* * * * *